(12) United States Patent
Miyashita

(10) Patent No.: US 10,705,258 B2
(45) Date of Patent: Jul. 7, 2020

(54) ANTIREFLECTION FILM, OPTICAL DEVICE, AND PRODUCTION METHOD FOR ANTIREFLECTION FILM

(71) Applicant: Seiko Epson Corporation, Tokyo (JP)

(72) Inventor: Kazuyuki Miyashita, Shiojiri (JP)

(73) Assignee: Seiko Epson Corporation (JP)

( * ) Notice: Subject to any disclaimer, the term of this patent is extended or adjusted under 35 U.S.C. 154(b) by 264 days.

(21) Appl. No.: 15/889,347

(22) Filed: Feb. 6, 2018

(65) Prior Publication Data
US 2018/0313979 A1 Nov. 1, 2018

(30) Foreign Application Priority Data
Apr. 27, 2017 (JP) ................. 2017-087985

(51) Int. Cl.
| | |
|---|---|
| G02B 1/115 | (2015.01) |
| G02B 26/10 | (2006.01) |
| G02B 7/182 | (2006.01) |
| G02B 26/08 | (2006.01) |
| G02B 5/00 | (2006.01) |
| G02B 27/10 | (2006.01) |
| G02B 27/14 | (2006.01) |

(52) U.S. Cl.
CPC ............. *G02B 1/115* (2013.01); *G02B 5/003* (2013.01); *G02B 7/1821* (2013.01); *G02B 26/085* (2013.01); *G02B 26/10* (2013.01); *G02B 26/101* (2013.01); *G02B 27/104* (2013.01); *G02B 27/141* (2013.01)

(58) Field of Classification Search
CPC ...... G02B 1/115; G02B 1/116; G02B 5/0816; G02B 5/085; G02B 5/0858; G02B 5/0875; G02B 26/0816; G02B 26/0833; G02B 26/0841; G02B 26/085; G02B 26/0858; G02B 26/0866; G02B 26/10; G02B 26/101; G02B 26/105; G02B 26/12; G02B 26/121
USPC ........ 359/359, 360, 580, 585, 586, 587, 588
See application file for complete search history.

(56) References Cited

U.S. PATENT DOCUMENTS

| | | | | |
|---|---|---|---|---|
| 4,282,290 A | * | 8/1981 | Pellicori ............... | G01J 5/0853 428/472 |
| 5,091,244 A | * | 2/1992 | Biornard ............ | C03C 17/3435 428/216 |
| 5,753,375 A | * | 5/1998 | Ray .................. | H01L 21/76877 257/E21.585 |
| 7,589,885 B2 | * | 9/2009 | Sohn .................. | G02B 26/0841 359/237 |

(Continued)

FOREIGN PATENT DOCUMENTS

| | | |
|---|---|---|
| JP | 2006-039156 A | 2/2006 |
| JP | 2007-206136 A | 8/2007 |

*Primary Examiner* — Nicholas R. Pasko
(74) *Attorney, Agent, or Firm* — Harness, Dickey & Pierce, P.L.C.

(57) ABSTRACT

An antireflection film includes a light shielding layer which is placed on a substrate and contains an electrical conductor, a first transmission layer which is placed on the light shielding layer and contains a dielectric, a semi-transmission layer which is placed on the first transmission layer and contains an electrical conductor, and a second transmission layer which is placed on the semi-transmission layer and contains a dielectric, wherein the light shielding layer and the semi-transmission layer have a larger extinction coefficient than the first transmission layer and the second transmission layer.

11 Claims, 10 Drawing Sheets

(56) References Cited

U.S. PATENT DOCUMENTS

| | | | | |
|---|---|---|---|---|
| 7,672,343 B2* | 3/2010 | Brown | ................. | B23K 26/064 |
| | | | | 372/15 |
| 8,830,550 B2* | 9/2014 | Nakamura | ......... | G02B 26/0833 |
| | | | | 359/224.1 |
| 8,928,980 B2* | 1/2015 | Weissenrieder | .... | G03F 7/70958 |
| | | | | 359/359 |
| 2011/0249326 A1* | 10/2011 | Villuendas Yuste | .... | C23C 14/35 |
| | | | | 359/360 |
| 2016/0299259 A1* | 10/2016 | You | .......................... | C09D 7/40 |

* cited by examiner

ANTIREFLECTION FILM, OPTICAL DEVICE, AND PRODUCTION METHOD FOR ANTIREFLECTION FILM

BACKGROUND

1. Technical Field

The present invention relates to an antireflection film, an optical device, and a production method for an antireflection film.

2. Related Art

An optical scanner in which a mirror to be irradiated with light is supported by a torsion bar so as to oscillate the mirror is disclosed in JP-A-2006-39156 (Patent Document 1). According to this, a planar coil is placed on the mirror, and a magnet is placed near the planar coil. Then, the mirror oscillates by applying an alternating current to the coil.

When the mirror is irradiated with light, part of the light is irradiated onto a support which supports the mirror. Light reflected by the support becomes unnecessary light and travels. This unnecessary light becomes noise for light reflected by the mirror. The optical scanner of Patent Document 1 prevents the reflection of unnecessary light from the support by placing an antireflection film on the support.

A filter which absorbs light is disclosed in JP-A-2007-206136 (Patent Document 2). According to this, the filter is configured to alternately stacking a titanium film and an aluminum oxide film so as to adjust the intensity of light transmitted through the filter.

The antireflection film of Patent Document 1 is a film in which $SiO_2$, $TiO_2$, $ZnO_2$, etc. are stacked. However, $SiO_2$, $TiO_2$, and $ZnO_2$ have a low extinction coefficient which shows the degree to which light is absorbed by a film. Due to this, when a film having a high reflectance is placed on the surface of the support, the antireflection film is susceptible to the effect of the light reflected by the support. That is, the antireflection film is susceptible to the effect of the reflectance of the support. Therefore, an antireflection film capable of reliably suppressing the reflection of light irradiated onto the antireflection film even when the reflectance of a substrate such as a support is high has been awaited.

SUMMARY

An advantage of some aspects of the invention is to solve the problems described above and the invention can be implemented as the following forms or application examples.

Application Example 1

An antireflection film according to this application example includes a light shielding layer which is placed on a substrate and contains an electrical conductor, a first transmission layer which is placed on the light shielding layer and contains a dielectric, a semi-transmission layer which is placed on the first transmission layer and contains an electrical conductor, and a second transmission layer which is placed on the semi-transmission layer and contains a dielectric, wherein the light shielding layer and the semi-transmission layer have a larger extinction coefficient than the first transmission layer and the second transmission layer.

According to this application example, a light shielding layer, a first transmission layer, a semi-transmission layer, and a second transmission layer are placed on a substrate in this order. The light shielding layer and the semi-transmission layer contain an electrical conductor, and the first transmission layer and the second transmission layer contain a dielectric. Light is incident on the second transmission layer from the opposite side to the semi-transmission layer. The surface on which light is incident of the second transmission layer is defined as "incident surface". Part of light which is incident on the incident surface passes through the second transmission layer and the semi-transmission layer. Further, the light travels through the first transmission layer to reach an interface between the first transmission layer and the light shielding layer. At the interface between the first transmission layer and the light shielding layer, part of the light is reflected and changes its traveling direction. The reflected light passes through the first transmission layer and the semi-transmission layer, and then travels through the second transmission layer to reach the incident surface.

Part of the light which travels through the second transmission layer is reflected by the incident surface and passes through the semi-transmission layer, and then travels toward the first transmission layer. The semi-transmission layer has a large extinction coefficient, and therefore, when the light passes through the semi-transmission layer, the light intensity is attenuated, and the light is converted into heat. Therefore, the light which travels between the incident surface and the interface between the first transmission layer and the light shielding layer is attenuated whenever it passes through the semi-transmission layer.

At the interface between the first transmission layer and the light shielding layer, part of the light penetrates through the light shielding layer. Since the light shielding layer has a large extinction coefficient, part of the light which travels through the light shielding layer is absorbed by the light shielding layer. Therefore, also when the reflectance of the substrate is high, the light shielding layer can extinct the light. As a result, also when the reflectance of the substrate is high, the reflection of light irradiated onto the antireflection film can be reliably suppressed by the antireflection film.

Application Example 2

In the antireflection film according to the application example, it is preferred that the material of the light shielding layer contains any of titanium, gold, chromium, nickel, platinum, tin, copper, and iron, the material of the first transmission layer contains aluminum oxide, the material of the semi-transmission layer contains titanium, and the material of the second transmission layer contains aluminum oxide.

According to this application example, the material of the light shielding layer contains any of titanium, gold, chromium, nickel, platinum, tin, copper, and iron. Titanium, gold, chromium, nickel, platinum, tin, copper, and iron have a larger extinction coefficient than silicon dioxide, titanium oxide, and zinc peroxide, and therefore can efficiently attenuate light which passes through the layer. The material of the semi-transmission layer contains titanium. Titanium has a larger extinction coefficient than silicon dioxide, titanium oxide, and zinc peroxide, and therefore can efficiently attenuate light which passes through the layer. The material of the first transmission layer and the second transmission layer contains aluminum oxide. The refractive index of aluminum oxide is between the refractive index of air and the refractive index of titanium. As a difference in refractive index is larger, the reflectance becomes higher. Therefore, the reflectance when light penetrates through a layer of aluminum oxide from air can be made smaller than the reflectance when light penetrates through a layer of titanium from air. As a result, the reflectance of the antireflection film can be made smaller than when only the light shielding layer is placed on the substrate.

Application Example 3

In the antireflection film according to the application example, it is preferred that the thickness of the light shielding layer is larger than that of the semi-transmission layer.

According to this application example, the thickness of the light shielding layer is larger than that of the semi-transmission layer. By setting the thickness of the light shielding layer large, light which penetrates through the light shielding layer can be reliably attenuated. Accordingly, also when the reflectance of the substrate is high, light incident on the light shielding layer can be reliably attenuated by the light shielding layer.

Application Example 4

In the antireflection film according to the application example, it is preferred that the light shielding layer is a titanium layer having a thickness of 80 nm or more and 150 nm or less.

According to this application example, the material of the light shielding layer is titanium, and the thickness of the light shielding layer is 80 nm or more. When the thickness of the light shielding layer is 80 nm or more, the effect of light which passes through the light shielding layer and is reflected can be reduced. Further, by setting the thickness of the light shielding layer to 150 nm or less, the light shielding layer can be produced with high productivity.

Application Example 5

In the antireflection film according to the application example, it is preferred that the first transmission layer is an aluminum oxide layer having a thickness of 70 nm or more and 90 nm or less, the semi-transmission layer is a titanium layer having a thickness of 9 nm or more and 12 nm or less, and the second transmission layer is an aluminum oxide layer having a thickness of 60 nm or more and 80 nm or less.

According to this application example, the first transmission layer is an aluminum oxide layer having a thickness of 70 nm or more and 90 nm or less. Then, the semi-transmission layer is a titanium layer having a thickness of 9 nm or more and 12 nm or less. Then, the second transmission layer is an aluminum oxide layer having a thickness of 60 nm or more and 80 nm or less. At this time, the thickness of each layer is set so as to decrease the reflectance with respect to light with a wavelength of 450 nm to 650 nm, and therefore, the antireflection film can reliably suppress the reflection of light.

Application Example 6

In the antireflection film according to the application example, it is preferred that the first transmission layer has a thickness of 75 nm or more and 85 nm or less, the semi-transmission layer has a thickness of 10 nm or more and 11 nm or less, and the second transmission layer has a thickness of 65 nm or more and 75 nm or less.

According to this application example, the first transmission layer has a thickness of 75 nm or more and 85 nm or less. Then, the semi-transmission layer has a thickness of 10 nm or more and 11 nm or less. Then, the second transmission layer has a thickness of 65 nm or more and 75 nm or less. At this time, the thickness of each layer is set so as to further decrease the reflectance with respect to light with a wavelength of 450 nm to 650 nm, and therefore, the antireflection film can more reliably suppress the reflection of light.

Application Example 7

An optical device according to this application example includes a light absorbing portion, wherein the antireflection film according to the application example is placed on the light absorbing portion.

According to this application example, the optical device includes a light absorbing portion. Then, the antireflection film is placed on the light absorbing portion. In this antireflection film, a light shielding layer, a first transmission layer, a semi-transmission layer, and a second transmission layer are placed on a substrate. The antireflection film having this structure can reliably suppress the reflection of light irradiated onto the light absorbing portion. Therefore, the optical device can reliably suppress the reflection of light to be irradiated onto the light absorbing portion.

Application Example 8

In the optical device according to the application example, it is preferred that the device includes a mirror which reflects light, the light absorbing portion includes a torsion bar which rotatably supports the mirror, and the optical device scans in the traveling direction of a light beam to be irradiated onto the mirror.

According to this application example, the optical device includes a mirror which reflects light. Then, the light absorbing portion includes a torsion bar which rotatably supports the mirror. The mirror is rotated by twisting the torsion bar. Then, by rotating the mirror, the optical device scans in the traveling direction of a light beam to be irradiated onto the mirror.

Then, the antireflection film is placed on the light absorbing portion. This antireflection film can reliably suppress the reflection of light irradiated onto this antireflection film. Therefore, the optical device reflects light to be irradiated onto the mirror and can reliably suppress the reflection of light to be irradiated onto the torsion bar.

Application Example 9

A production method for an antireflection film according to this application example includes placing a light shielding layer on a substrate, placing a first transmission layer on the light shielding layer, placing a semi-transmission layer on the first transmission layer, and placing a second transmission layer on the semi-transmission layer, wherein an ALCVD method is used when placing at least one of the first transmission layer and the second transmission layer.

According to this application example, in the production method for an antireflection film, a light shielding layer, a first transmission layer, a semi-transmission layer, and a second transmission layer are placed on a substrate in this order. Then, an ALCVD (Atomic Layer Chemical Vapor Deposition) method is used when placing at least one of the first transmission layer and the second transmission layer. The ALCVD method can stack aluminum oxide at the atomic level, and therefore, an aluminum oxide layer having a film thickness with high accuracy can be placed as at least one of the first transmission layer and the second transmission layer.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments will be described with reference to the drawings. Incidentally, the respective members in the respective drawings are shown by changing the reduced scale for each member so as to have a recognizable size in the respective drawings.

First Embodiment

Figure 1:
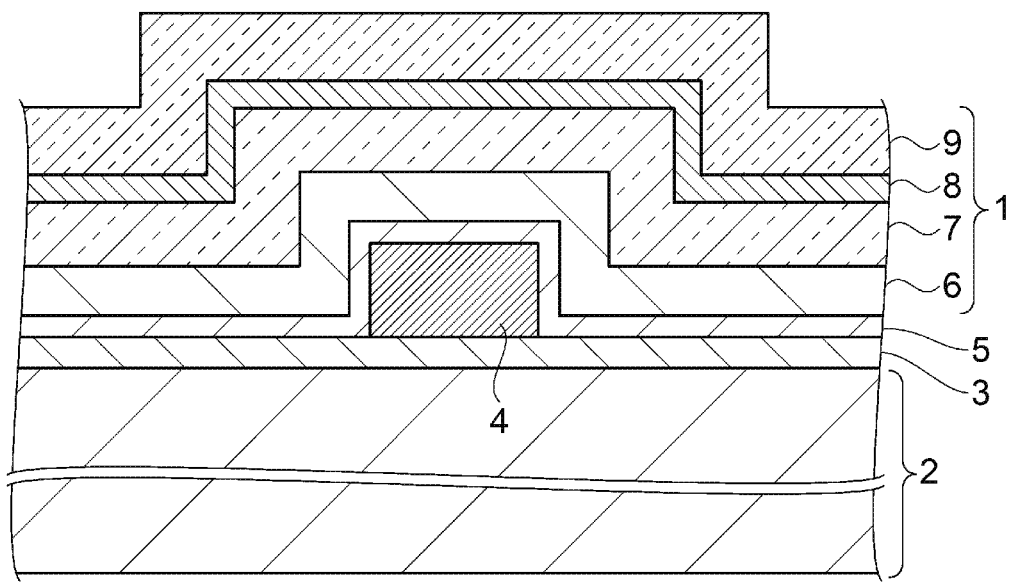
FIG. 1 is a schematic side cross-sectional view showing the structure of an antireflection film according to a first embodiment.

In this embodiment, an antireflection film placed on a substrate, and a characteristic example of the production of this antireflection film will be described with reference to the drawings. The antireflection film according to the first embodiment will be described with reference to FIGS. 1 to 6. FIG. 1 is a schematic side cross-sectional view showing the structure of the antireflection film. As shown in FIG. 1, an antireflection film 1 is placed on a substrate 2. The substrate 2 may be any as long as it is a structure having rigidity and heat resistance, and the material of the substrate 2 is not particularly limited. For example, as the substrate 2, a silicon substrate, a glass plate, a metal plate, a ceramic substrate, or the like can be used. In this embodiment, for example, the material of the substrate 2 is silicon. Therefore, the substrate 2 becomes a substrate to be used for semiconductors or MEMS (Micro Electro Mechanical Systems). The antireflection film 1 is a film which suppresses the reflection of light to be irradiated onto the substrate 2.

To be more specific, on the substrate 2, a first insulating film 3 is placed, and on the first insulating film 3, a wiring 4 is placed. On the first insulating film 3 and the wiring 4, a second insulating film 5 is placed. The first insulating film 3 and the second insulating film 5 are placed so as to cover the wiring 4, and therefore, also when an electric current flows through the wiring 4, leakage of the electric current flowing through the wiring 4 to the substrate 2 or the antireflection film 1 is suppressed. An electric element such as a piezoresistive element may be placed instead of the wiring 4.

In this manner, the antireflection film 1 may be placed on portions such as the first insulating film 3, the wiring 4, and the second insulating film 5 placed on the substrate 2, and the antireflection film 1 may be placed superimposed on the substrate 2.

On the second insulating film 5, a light shielding layer 6 is placed. The light shielding layer 6 is placed on the substrate 2 through the first insulating film 3, the wiring 4, and the second insulating film 5. The light shielding layer 6 is a layer on the side closest to the substrate 2 in the antireflection film 1. The light shielding layer 6 is a layer containing an electrical conductor. The material of the electrical conductor is preferably a material which has a large light extinction coefficient, is a specular reflective material, and has a low material reflectance. The material of the electrical conductor in the light shielding layer 6 preferably contains, for example, a metal such as titanium, gold, chromium, nickel, platinum, tin, copper, or iron, or an alloy of any of these metals. Such a metal has a material reflectance of 70 or less, and has a lower material reflectance than mercury, aluminum, and silver. In this embodiment, for example, as the material of the electrical conductor of the light shielding layer 6, titanium is used. Therefore, the light shielding layer 6 is a film composed of titanium, but may be a film containing an inclusion other than titanium.

On the light shielding layer 6, a first transmission layer 7 is placed. The first transmission layer 7 is a layer containing a dielectric. The material of the dielectric is preferably a material having a lower light refractive index than an electrical conductor, and in this embodiment, for example, aluminum oxide ($Al_2O_3$) is adopted. The material of the first transmission layer 7 is aluminum oxide, however, a film which contains aluminum oxide and also contains an inclusion other than aluminum oxide may be adopted. Aluminum oxide shows a refractive index of 1.66 and, although it is lower than the refractive index of $SiO_2$ (1.46), aluminum oxide is favorable as a low-refractive index material.

On the first transmission layer 7, a semi-transmission layer 8 is placed. The semi-transmission layer 8 is a layer containing an electrical conductor. The material of the electrical conductor may be any as long as it is a material having a large light extinction coefficient, and in this embodiment, for example, titanium is adopted. The material of the semi-transmission layer 8 is titanium, however, a film which contains titanium and also contains an inclusion other than titanium may be adopted.

On the semi-transmission layer 8, a second transmission layer 9 is placed. The second transmission layer 9 is a layer containing a dielectric. The material of the dielectric may be any as long as it is a material having a lower light refractive index than an electrical conductor, and in this embodiment, for example, aluminum oxide is adopted. The material of the second transmission layer 9 is aluminum oxide, however, a film which contains aluminum oxide and also contains an inclusion other than aluminum oxide may be adopted.

The light shielding layer 6 and the semi-transmission layer 8 have a larger extinction coefficient than the first transmission layer 7 and the second transmission layer 9. The extinction coefficient of titanium to be used for the light shielding layer 6 and the semi-transmission layer 8 changes between 1.2 and 3.0 when the wavelength is from 400 nm to 700 nm. The extinction coefficient of aluminum oxide to be used for the first transmission layer 7 and the second transmission layer 9 shows a value close to 0. Therefore, titanium has a larger extinction coefficient than aluminum oxide.

Figure 2:
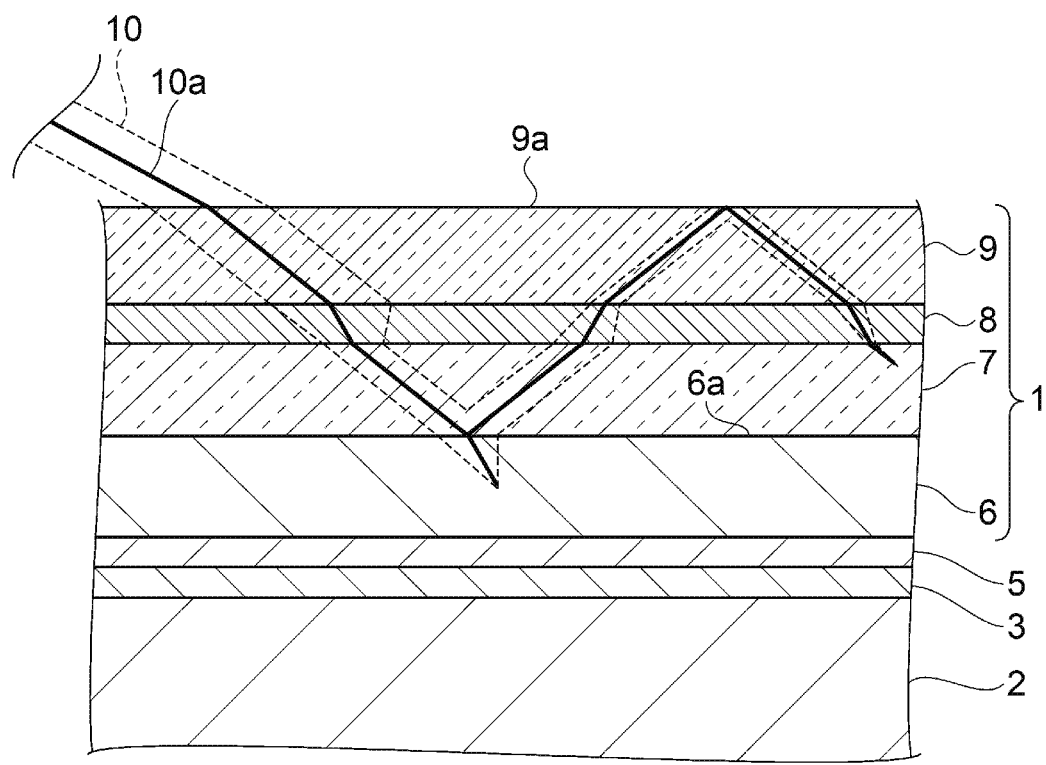
FIG. 2 is a schematic view for illustrating a manner in which light travels through the antireflection film and is attenuated.

FIG. 2 is a schematic view for illustrating a manner in which light travels through the antireflection film and is attenuated. As shown in FIG. 2, light 10 is incident on the second transmission layer 9 on the opposite side to the semi-transmission layer 8 from air. In the drawing, an optical axis 10a shows a track along which a portion having the highest intensity of the light 10 travels. The width of the light 10 indicated by a dotted line shows the intensity of the light 10. A place where the width of the light 10 is wide shows a state that the intensity of the light 10 is high, and a place where the width of the light 10 is narrow shows a state that the intensity of the light 10 is low.

The surface on which the light 10 is incident of the second transmission layer 9 is defined as "incident surface 9a". Part of the light 10 which is incident on the incident surface 9a passes through the second transmission layer 9 and the semi-transmission layer 8, and then travels through the first transmission layer 7 to reach an interface 6a between the first transmission layer 7 and the light shielding layer 6. At the interface 6a between the first transmission layer 7 and the light shielding layer 6, part of the light 10 is reflected and changes its traveling direction. The reflected light 10 passes through the first transmission layer 7 and the semi-transmission layer 8, and then travels through the second transmission layer 9 to reach the incident surface 9a.

Part of the light 10 which travels through the second transmission layer 9 is reflected by the incident surface 9a and passes through the semi-transmission layer 8, and then travels toward the first transmission layer 7. The semi-transmission layer 8 has a large extinction coefficient, and therefore, when light passes through the semi-transmission layer 8, the light intensity is attenuated, and the light is converted into heat. Therefore, the light 10 which travels between the incident surface 9a and the interface 6a between the first transmission layer 7 and the light shielding layer is greatly attenuated whenever it passes through the semi-transmission layer 8.

At the interface 6a between the first transmission layer 7 and the light shielding layer 6, part of the light 10 penetrates through the light shielding layer 6. Since the light shielding layer 6 has a large extinction coefficient, the light which travels through the light shielding layer 6 is absorbed by the light shielding layer 6. Therefore, also when the reflectance of the substrate 2 or the wiring 4 is high, the light shielding layer 6 can extinct the light 10. As a result, also when the reflectance of the substrate 2 or the wiring 4 is high, the reflection of the light 10 irradiated onto the antireflection film 1 can be reliably suppressed by the antireflection film 1.

The material of the light shielding layer 6 and the semi-transmission layer 8 contains titanium. Titanium has a larger extinction coefficient than silicon dioxide, titanium oxide, and zinc peroxide, and therefore can efficiently attenuate the light 10 which passes through the layer. The material of the first transmission layer 7 and the second transmission layer 9 contains aluminum oxide. The refractive index of air is about 1.0 when the wavelength of the light 10 is within a range from 400 nm to 700 nm. The refractive index of aluminum oxide is about 1.66. Then, the refractive index of titanium changes between 1.7 and 2.7. At this time, the refractive index of aluminum oxide is between the refractive index of air and the refractive index of titanium. As a difference in refractive index is larger, the reflectance becomes higher. Therefore, the reflectance when light penetrates through a layer of aluminum oxide from air can be made smaller than the reflectance when light penetrates through a layer of titanium from air. As a result, the reflectance of the antireflection film 1 can be made smaller when only the light shielding layer 6 is placed on the substrate.

The thickness of the light shielding layer 6 is larger than that of the semi-transmission layer 8. By setting the thickness of the light shielding layer 6 large, the light 10 which penetrates through the light shielding layer 6 can be reliably attenuated. Accordingly, light incident on the light shielding layer 6 can be reliably attenuated by the light shielding layer 6. As a result, also when the reflectance of the substrate 2 is high, the light 10 to be irradiated onto the substrate 2 can be reliably attenuated by the antireflection film 1.

Figure 3:
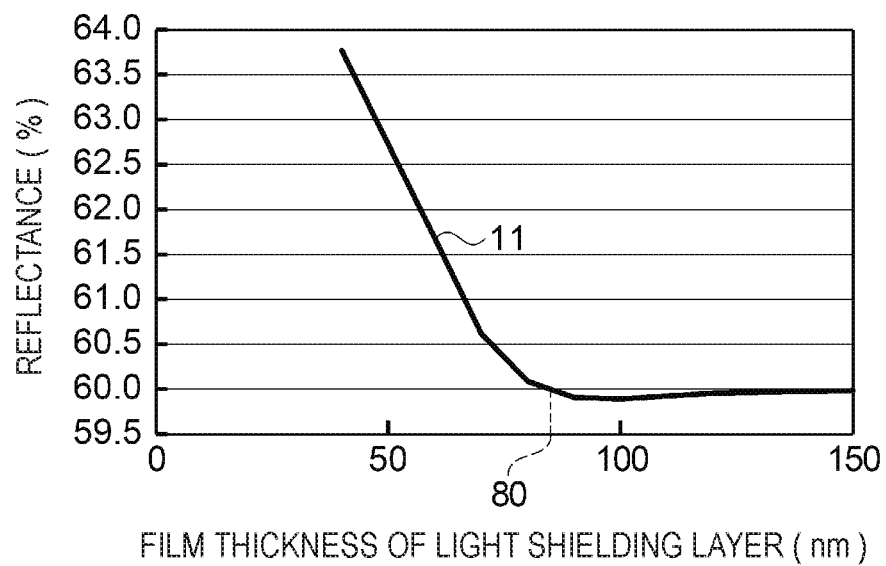
FIG. 3 is a view showing a relationship of the reflectance with the film thickness of a light shielding layer.

FIG. 3 is a view showing a relationship of the reflectance with the film thickness of the light shielding layer. In FIG. 3, the horizontal axis represents the film thickness of the light shielding layer 6, and the vertical axis represents the reflectance of light reflected by the light shielding layer 6. The light shielding layer 6 is a titanium film. Then, data in a state where the first transmission layer 7, the semi-transmission layer 8, and the second transmission layer 9 are not placed on the light shielding layer 6 are shown. A film thickness-reflectance correlation line 11 shows a relationship between the film thickness of the light shielding layer 6 and the reflectance of the light 10 reflected by the light shielding layer 6. The film thickness-reflectance correlation line 11 shows a relationship between the film thickness of the light shielding layer 6 and the reflectance in a state where a silicon dioxide film in which the first insulating film 3 and the second insulating film 5 are put together and which has a thickness of 200 nm is placed on the substrate 2, and the light shielding layer 6 of titanium is placed thereon. The wavelength of the light 10 to be irradiated onto the light shielding layer 6 is 700 nm.

As shown by the film thickness-reflectance correlation line 11, the reflectance greatly changes when the film thickness of the light shielding layer 6 is within a range from 40 nm to 70 nm. Within this range, part of the light 10 is transmitted through the light shielding layer 6 to reach the first insulating film 3, the second insulating film 5, and the substrate 2 which are the lower layers. Then, the light 10 is reflected by the first insulating film 3, the second insulating film 5, and the substrate 2 and passes through the light shielding layer 6. When the film thickness of the light shielding layer 6 is within a range of 80 nm or more, the reflectance is around 60% and becomes a substantially constant reflectance. Within this range, the light 10 which travels through the light shielding layer 6 is attenuated and disappears in the light shielding layer 6. Even if the light 10 is reflected by the first insulating film 3, the second insulating film 5, and the substrate 2, the light 10 is in a state where it does not pass through the light shielding layer 6.

Therefore, the thickness of the light shielding layer 6 is preferably 80 nm or more. When the thickness of the light shielding layer 6 is 80 nm or more, the effect of the light which passes through the light shielding layer 6 and is reflected can be reduced. Further, the thickness of the light shielding layer 6 is preferably 150 nm or less. When the light shielding layer 6 is produced using a sputtering method, as the film thickness is larger, the time required for forming a film becomes longer, and thus, the productivity is decreased. Therefore, by setting the thickness of the light shielding layer 6 to 150 nm or less, the light shielding layer 6 can be produced with high productivity.

Figure 4:
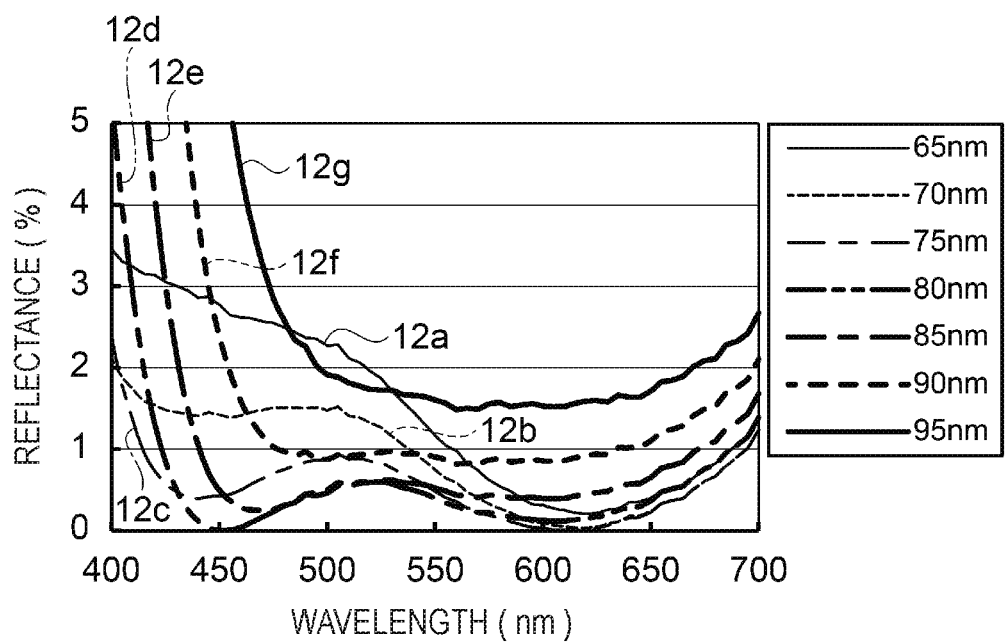
FIG. 4 is a view showing a relationship of the reflectance of the antireflection film with the wavelength of light by using the film thickness of a first transmission layer as a parameter.

FIG. 4 is a view showing a relationship of the reflectance of the antireflection film with the wavelength of light by using the film thickness of the first transmission layer as a parameter. In FIG. 4, the horizontal axis represents the wavelength of the light 10 irradiated onto the antireflection film 1, and the vertical axis represents the reflectance of the light 10 reflected by the antireflection film 1. The thickness of the light shielding layer 6 is set to 90 nm, the thickness of the semi-transmission layer 8 is set to 10.24 nm, and the thickness of the second transmission layer 9 is set to 70 nm. Then, the results of simulating a relationship between the wavelength of the light 10 irradiated onto the antireflection film 1 and the reflectance of the light reflected by the antireflection film 1 by changing the thickness of the first transmission layer 7 from 65 nm to 95 nm in increments of 5 nm are shown in the drawing.

The material of the light shielding layer 6 is titanium, the material of the first transmission layer 7 is aluminum oxide, the material of the semi-transmission layer 8 is titanium, and the material of the second transmission layer 9 is aluminum oxide. A first correlation line 12a of the first transmission layer shows a relationship of the reflectance with the wavelength of the light 10 when the film thickness is 65 nm. A second correlation line 12b of the first transmission layer and a third correlation line 12c of the first transmission layer show a relationship of the reflectance with the wavelength of the light 10 when the film thickness is 70 nm and when the film thickness is 75 nm, respectively.

A fourth correlation line 12d of the first transmission layer and a fifth correlation line 12e of the first transmission layer show a relationship of the reflectance with the wavelength of the light 10 when the film thickness is 80 nm and when the film thickness is 85 nm, respectively. A sixth correlation line 12f of the first transmission layer and a seventh correlation line 12g of the first transmission layer show a relationship of the reflectance with the wavelength of the light 10 when the film thickness is 90 nm and when the film thickness is 95 nm, respectively.

The wavelength of the light 10 as a subject is set within a range from 450 nm to 650 nm. What show a reflectance of 2% or less within this range are the second correlation line 12b of the first transmission layer, the third correlation line 12c of the first transmission layer, the fourth correlation line 12d of the first transmission layer, the fifth correlation line 12e of the first transmission layer, and the sixth correlation line 12f of the first transmission layer. Therefore, by setting the film thickness of the first transmission layer 7 within a range from 70 nm to 90 nm, the reflectance can be decreased to 2% or less.

What show a reflectance of 1% or less are the third correlation line 12c of the first transmission layer, the fourth correlation line 12d of the first transmission layer, and the fifth correlation line 12e of the first transmission layer. Therefore, by setting the film thickness of the first transmission layer 7 within a range from 75 nm to 85 nm, the reflectance can be decreased to 1% or less. Further, by setting the film thickness of the first transmission layer 7 to 80 nm, the reflectance can be decreased to 0.6% or less.

Figure 5:
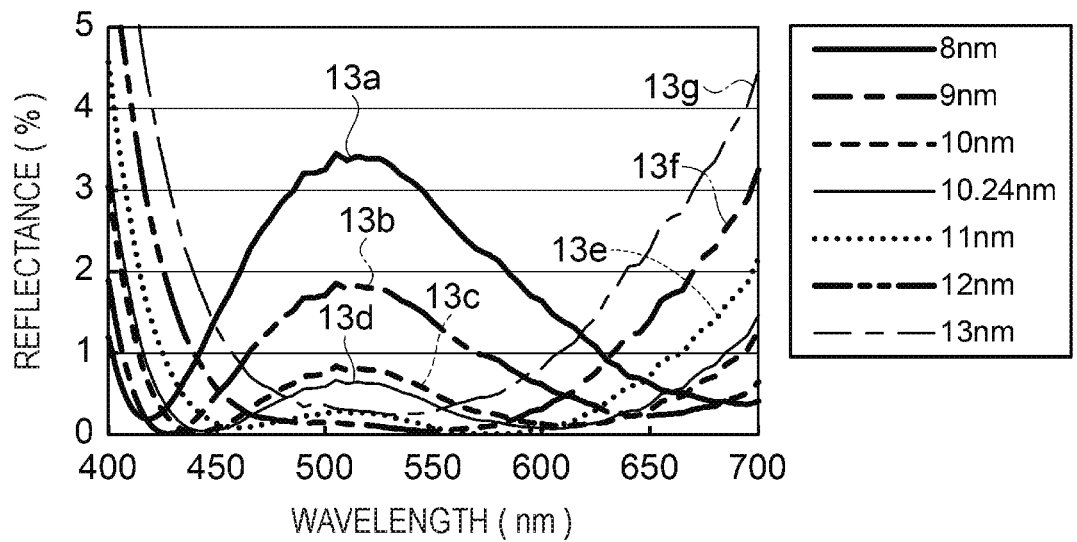
FIG. 5 is a view showing a relationship of the reflectance of the antireflection film with the wavelength of light by using the film thickness of a semi-transmission layer as a parameter.

FIG. 5 is a view showing a relationship of the reflectance of the antireflection film with the wavelength of light by using the film thickness of the semi-transmission layer as a parameter. In FIG. 5, the horizontal axis represents the wavelength of the light 10 irradiated onto the antireflection film 1, and the vertical axis represents the reflectance of the light 10 reflected by the antireflection film 1. The thickness of the light shielding layer 6 is set to 90 nm, the thickness of the first transmission layer 7 is set to 78 nm, and the thickness of the second transmission layer is set to 70 nm. Then, the results of simulating a relationship between the wavelength of the light 10 irradiated onto the antireflection film 1 and the reflectance of the light reflected by the antireflection film 1 when the thickness of the semi-transmission layer 8 is changed from 8 nm to 13 nm in increments of 1 nm, and also when the thickness of the semi-transmission layer 8 is set to 10.24 nm are shown in the drawing.

The material of the light shielding layer 6 is titanium, the material of the first transmission layer 7 is aluminum oxide, the material of the semi-transmission layer 8 is titanium, and the material of the second transmission layer 9 is aluminum oxide. A first correlation line 13a of the semi-transmission layer shows a relationship of the reflectance with the wavelength of the light 10 when the film thickness is 8 nm. A second correlation line 13b of the semi-transmission layer and a third correlation line 13c of the semi-transmission layer show a relationship of the reflectance with the wavelength of the light 10 when the film thickness is 9 nm and when the film thickness is 10 nm, respectively.

A fourth correlation line 13d of the semi-transmission layer and a fifth correlation line 13e of the semi-transmission layer show a relationship of the reflectance with the wavelength of the light 10 when the film thickness is 10.24 nm and when the film thickness is 11 nm, respectively. A sixth correlation line 13f of the semi-transmission layer and a seventh correlation line 13g of the semi-transmission layer show a relationship of the reflectance with the wavelength of the light 10 when the film thickness is 12 nm and when the film thickness is 13 nm, respectively.

The wavelength of the light 10 as a subject is set within a range from 450 nm to 650 nm. What show a reflectance of 2% or less within this range are the second correlation line 13b of the semi-transmission layer, the third correlation line 13c of the semi-transmission layer, the fourth correlation line 13d of the semi-transmission layer, the fifth correlation line 13e of the semi-transmission layer, and the sixth correlation line 13f of the semi-transmission layer. Therefore, by setting the film thickness of the semi-transmission layer 8 to 9 nm or more and 12 nm or less, the reflectance can be decreased to 2% or less.

What show a reflectance of 1% or less are the third correlation line 13c of the semi-transmission layer, the fourth correlation line 13d of the semi-transmission layer, and the fifth correlation line 13e of the semi-transmission layer. Therefore, by setting the film thickness of the semi-transmission layer 8 to 10 nm or more and 11 nm or less, the reflectance can be decreased to 1% or less. Further, by setting the film thickness of the semi-transmission layer 8 to 10.24 nm, the reflectance can be decreased to 0.7% or less.

Figure 6:
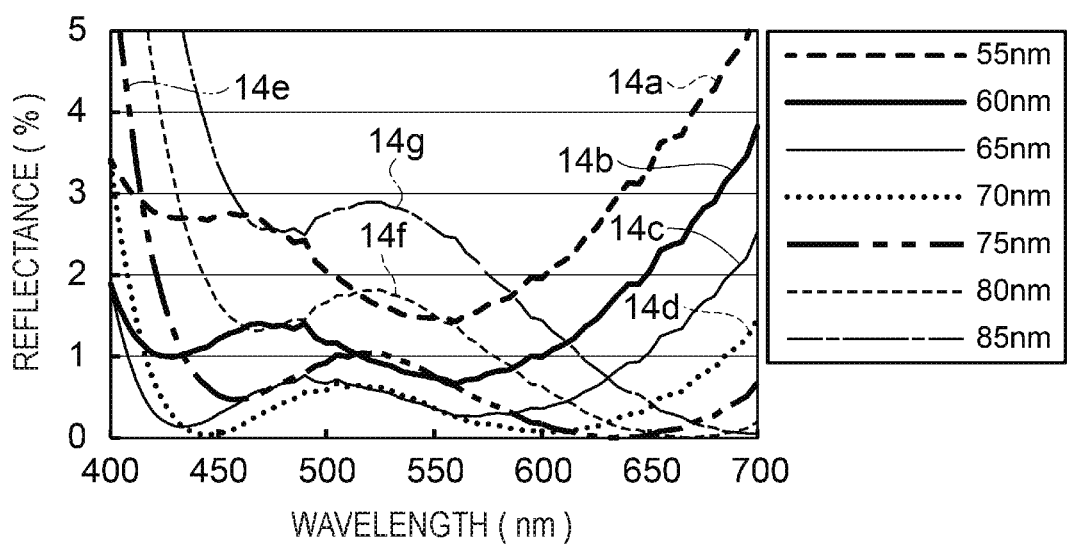
FIG. 6 is a view showing a relationship of the reflectance of the antireflection film with the wavelength of light by using the film thickness of a second transmission layer as a parameter.

FIG. 6 is a view showing a relationship of the reflectance of the antireflection film with the wavelength of light by using the film thickness of the second transmission layer as a parameter. In FIG. 6, the horizontal axis represents the wavelength of the light 10 irradiated onto the antireflection film 1, and the vertical axis represents the reflectance of the light 10 reflected by the antireflection film 1. The thickness of the light shielding layer 6 is set to 90 nm, the thickness of the first transmission layer 7 is set to 78 nm, and the thickness of the semi-transmission layer 8 is set to 10.24 nm. Then, the results of simulating a relationship between the wavelength of the light 10 irradiated onto the antireflection film 1 and the reflectance of the light reflected by the antireflection film 1 by changing the thickness of the second transmission layer 9 from 55 nm to 85 nm in increments of 5 nm are shown in the drawing.

The material of the light shielding layer 6 is titanium, the material of the first transmission layer 7 is aluminum oxide, the material of the semi-transmission layer 8 is titanium, and the material of the second transmission layer 9 is aluminum oxide. A first correlation line 14*a* of the second transmission layer shows a relationship of the reflectance with the wavelength of the light 10 when the film thickness is 55 nm. A second correlation line 14*b* of the second transmission layer and a third correlation line 14*c* of the second transmission layer show a relationship of the reflectance with the wavelength of the light 10 when the film thickness is 60 nm and when the film thickness is 65 nm, respectively.

A fourth correlation line 14*d* of the second transmission layer and a fifth correlation line 14*e* of the second transmission layer show a relationship of the reflectance with the wavelength of the light 10 when the film thickness is 70 nm and when the film thickness is 75 nm, respectively. A sixth correlation line 14*f* of the second transmission layer and a seventh correlation line 14*g* of the second transmission layer show a relationship of the reflectance with the wavelength of the light 10 when the film thickness is 80 nm and when the film thickness is 85 nm, respectively.

The wavelength of the light 10 as a subject is set within a range from 450 nm to 650 nm. What show a reflectance of 2% or less within this range are the second correlation line 14*b* of the second transmission layer, the third correlation line 14*c* of the second transmission layer, the fourth correlation line 14*d* of the second transmission layer, the fifth correlation line 14*e* of the second transmission layer, and the sixth correlation line 14*f* of the second transmission layer. Therefore, by setting the film thickness of the second transmission layer 9 within a range from 60 nm to 80 nm, the reflectance can be decreased to 2% or less.

What show a reflectance of 1% or less are the third correlation line 14*c* of the second transmission layer, the fourth correlation line 14*d* of the second transmission layer, and the fifth correlation line 14*e* of the second transmission layer. Therefore, by setting the film thickness of the second transmission layer 9 within a range from 65 nm to 75 nm, the reflectance can be decreased to 1% or less. Further, by setting the film thickness of the second transmission layer 9 to 70 nm, the reflectance can be decreased to 0.7% or less.

From the above simulation results, the thickness of the first transmission layer 7 of the antireflection film 1 is preferably 70 nm or more and 90 nm or less, the thickness of the semi-transmission layer 8 is preferably 9 nm or more and 12 nm or less, and the thickness of the second transmission layer 9 is preferably 60 nm or more and 80 nm or less. At this time, the thickness of each layer is set so as to decrease the reflectance with respect to light with a wavelength of 450 nm to 650 nm, and therefore, the antireflection film 1 can reliably suppress the reflection of the light 10.

From the above simulation results, the thickness of the first transmission layer 7 of the antireflection film 1 is preferably 75 nm or more and 85 nm or less, the thickness of the semi-transmission layer 8 is preferably 10 nm or more and 11 nm or less, and the thickness of the second transmission layer 9 is preferably 65 nm or more and 75 nm or less. At this time, the thickness of each layer is set so as to further decrease the reflectance with respect to light with a wavelength of 450 nm to 650 nm, and therefore, the antireflection film 1 can more reliably suppress the reflection of light.

From the above simulation results, the thickness of the first transmission layer 7 of the antireflection film 1 is preferably 80 nm, the thickness of the semi-transmission layer 8 is preferably 10.24 nm, and the thickness of the second transmission layer 9 is preferably 70 nm. At this time, the thickness of each layer is set so as to further decrease the reflectance with respect to light with a wavelength of 450 nm to 650 nm, and therefore, the antireflection film 1 can more reliably suppress the reflection of light.

Figure 7:
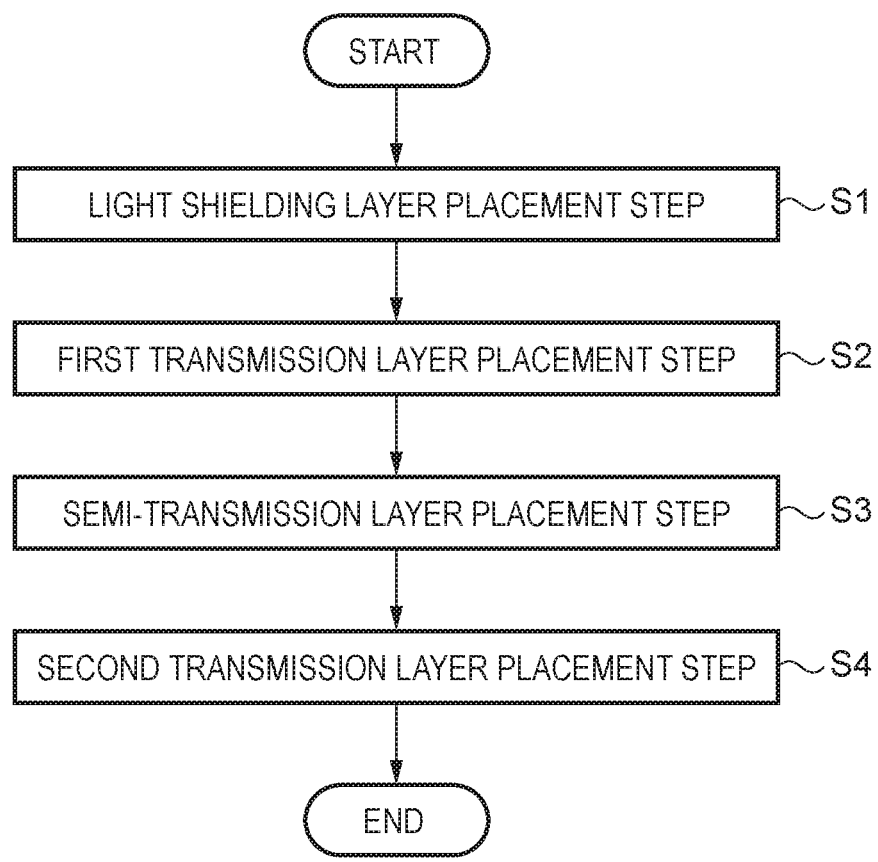
FIG. 7 is a flowchart of a production method for the antireflection film.

Next, a production method for the above-mentioned antireflection film 1 will be described with reference to FIGS. 7 to 12. FIG. 7 is a flowchart of the production method for the antireflection film, and FIGS. 8 to 12 are schematic views for illustrating the production method for the antireflection film. In the flowchart shown in FIG. 7, Step S1 corresponds to a light shielding layer placement step and is a step of placing the light shielding layer 6 on the second insulating film 5 on the substrate. Subsequently, the process proceeds to Step S2. Step S2 corresponds to a first transmission layer placement step and is a step of placing the first transmission layer 7 on the light shielding layer 6. Subsequently, the process proceeds to Step S3. Step S3 corresponds to a semi-transmission layer placement step and is a step of placing the semi-transmission layer 8 on the first transmission layer 7. Subsequently, the process proceeds to Step S4. Step S4 corresponds to a second transmission layer placement step and is a step of placing the second transmission layer 9 on the semi-transmission layer 8. By the above-mentioned steps, the antireflection film 1 is completed.

Figure 8:
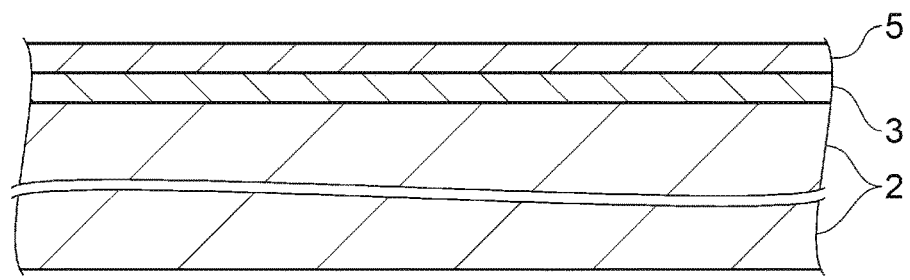
FIG. 8 is a schematic view for illustrating the production method for the antireflection film.
Figure 9:
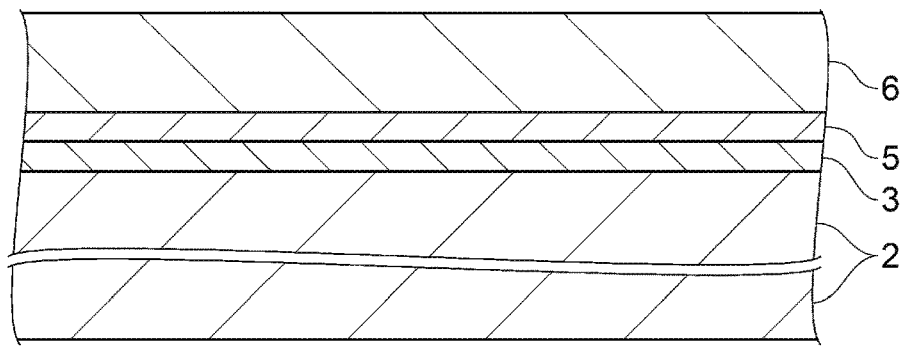
FIG. 9 is a schematic view for illustrating the production method for the antireflection film.

Next, with reference to FIGS. 8 to 12, the production method will be described in detail while being made to correspond to the steps shown in FIG. 7. FIGS. 8 and 9 are views corresponding to the light shielding layer placement step of Step S1. As shown in FIG. 8, the substrate 2 is prepared. The substrate 2 is a silicon substrate. On the substrate 2, the first insulating film 3 and the second insulating film 5 are placed. Each of the first insulating film 3 and the second insulating film 5 is a silicon dioxide film and is formed using a CVD method. Between the first insulating film 3 and the second insulating film 5, a wiring or an electric element may be placed.

As shown in FIG. 9, in Step S1, on the second insulating film 5, the light shielding layer 6 is formed. The material of the light shielding layer 6 is titanium. The thickness of the light shielding layer 6 may be 80 nm or more, and therefore, in this embodiment, for example, the thickness of the light shielding layer 6 is set to 90 nm. As the thickness is smaller, the time required for forming the film can be shortened, and therefore, the light shielding layer 6 can be formed with high productivity.

As the placement method for the light shielding layer 6, a sputtering method, a vapor deposition method, or a CVD (Chemical Vapor Deposition) method can be used. In this embodiment, for example, as the placement method for the light shielding layer 6, a sputtering method is adopted. In the sputtering method, by setting the film growth rate low, the accuracy of the film thickness can be enhanced.

Figure 10:
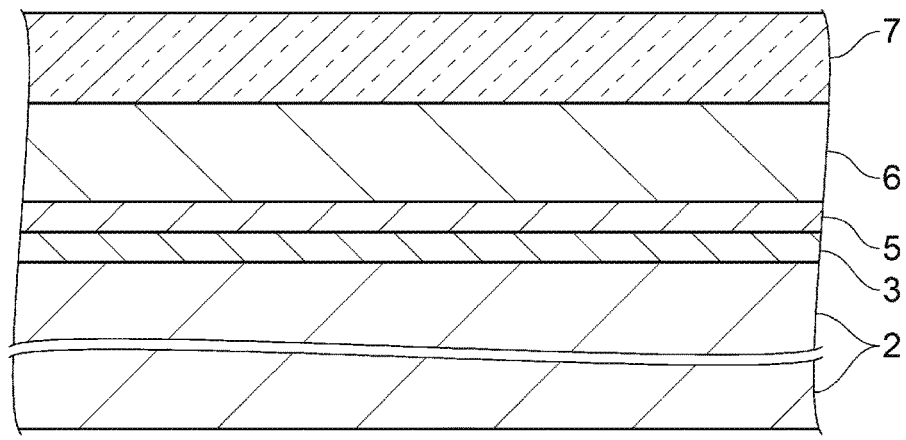
FIG. 10 is a schematic view for illustrating the production method for the antireflection film.

FIG. 10 is a view corresponding to the first transmission layer placement step of Step S2. As shown in FIG. 10, in Step S2, on the light shielding layer 6, the first transmission layer 7 is placed. The material of the first transmission layer 7 is aluminum oxide. The thickness of the first transmission layer 7 may be from 75 nm to 85 nm, and therefore, in this embodiment, for example, the thickness of the first transmission layer 7 is set to 80 nm.

As the placement method for the first transmission layer 7, it is preferred to use an ALCVD (Atomic Layer Chemical Vapor Deposition) method. When using ALCVD, aluminum oxide is deposited at the atomic level for each layer, and therefore, a film having a film thickness with high accuracy can be formed.

ALCVD is a known method, and only an outline will be described. Onto the substrate 2, a carrier gas and gaseous trimethyl aluminum are fed. An oxygen atom on the substrate and an aluminum atom are bound to each other. At this time, methyl bound to aluminum is separated from aluminum. An aluminum atom attached to the substrate 2 serves as a nucleus, and an aluminum film is grown along the surface of the substrate. When aluminum has covered the substrate 2, gaseous trimethyl aluminum and methyl floating above the substrate 2 are removed. This removal operation is called "purge".

Subsequently, oxygen gas is fed onto the substrate 2. Aluminum arranged on the substrate 2 and oxygen are bound to each other. After all aluminum on the substrate 2 is bound to oxygen, oxygen gas is removed. By the above step, a single layer of aluminum oxide is formed on the substrate 2. The above-mentioned step is repeated until the thickness of the first transmission layer 7 reaches 80 nm.

By using the ALCVD method, aluminum oxide can be stacked at the atomic level. Therefore, an aluminum oxide layer having a film thickness with high accuracy can be placed as the first transmission layer 7.

Figure 11:
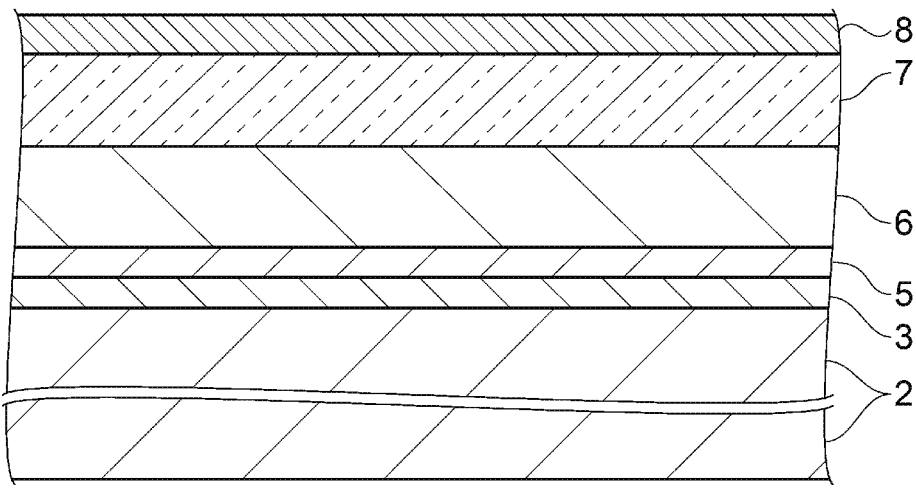
FIG. 11 is a schematic view for illustrating the production method for the antireflection film.

FIG. 11 is a view corresponding to the semi-transmission layer placement step of Step S3. As shown in FIG. 11, in Step S3, on the first transmission layer 7, the semi-transmission layer 8 is placed. The material of the semi-transmission layer 8 is titanium. The thickness of the semi-transmission layer 8 may be 10 nm or more and 11 nm or less, and therefore, in this embodiment, for example, the thickness of the semi-transmission layer 8 is set to 10.24 nm.

As the placement method for the semi-transmission layer 8, a sputtering method, a vapor deposition method, or a CVD (Chemical Vapor Deposition) method can be used. In this embodiment, for example, as the placement method for the semi-transmission layer 8, a sputtering method is adopted in the same manner as the placement method for the light shielding layer 6. In the sputtering method, by setting the film growth rate low, the accuracy of the film thickness can be enhanced.

Figure 12:
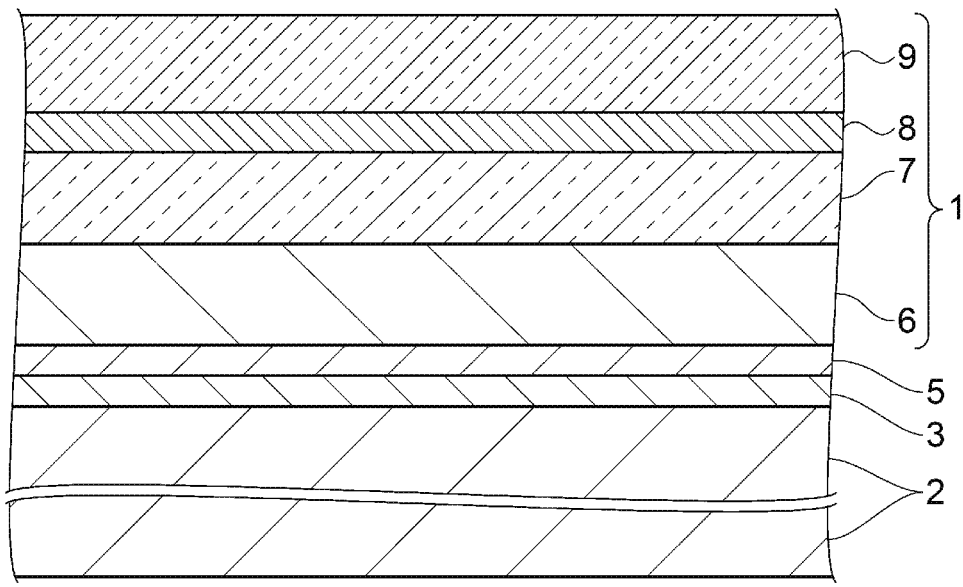
FIG. 12 is a schematic view for illustrating the production method for the antireflection film.

FIG. 12 is a view corresponding to the second transmission layer placement step of Step S4. As shown in FIG. 12, in Step S4, on the semi-transmission layer 8, the second transmission layer 9 is placed. The material of the second transmission layer 9 is aluminum oxide. The thickness of the second transmission layer 9 may be from 65 nm to 75 nm, and therefore, in this embodiment, for example, the thickness of the second transmission layer 9 is set to 70 nm.

As the placement method for the second transmission layer 9, it is preferred to use an ALCVD (Atomic Layer Chemical Vapor Deposition) method in the same manner as the first transmission layer 7. By using the ALCVD method, aluminum oxide can be stacked at the atomic level. Therefore, an aluminum oxide layer having a film thickness with high accuracy can be placed as the second transmission layer 9. By the above-mentioned steps, the antireflection film 1 is completed.

Figure 13:
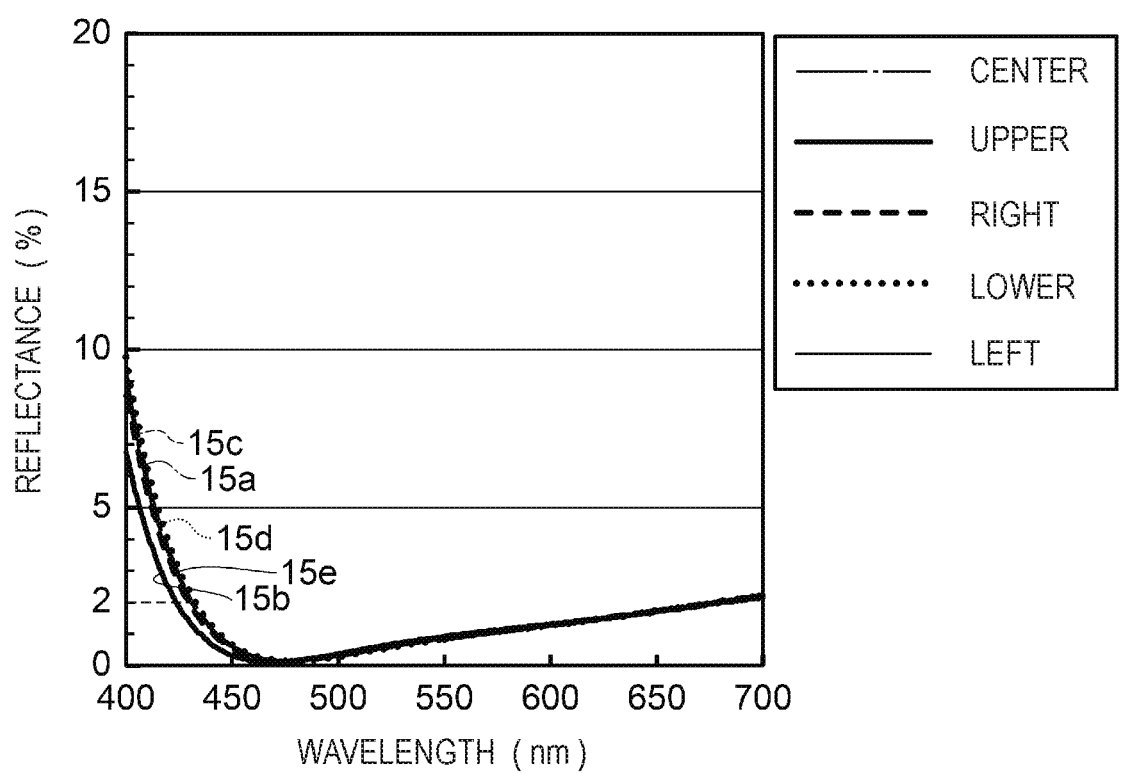
FIG. 13 is a view showing the distribution of the reflectance of the antireflection film formed on a 6-inch silicon wafer.

FIG. 13 is a view showing the distribution of the reflectance of the antireflection film formed on a 6-inch silicon wafer. In FIG. 13, the horizontal axis represents the wavelength of the light 10 irradiated onto the antireflection film 1, and the vertical axis represents the reflectance of the light 10 reflected by the antireflection film 1. A correlation line 15a of a central portion shows a relationship of the reflectance with the wavelength of the light 10 in a central portion when viewing the wafer from the thickness direction. The wafer has a disk shape, and the central portion refers to a portion of the center of an outer peripheral circle. The wafer is divided into four portions by two lines passing the center of the wafer and orthogonal to each other when viewing the wafer from the thickness direction. Four points at which these lines intersect with a circle centering on the center of the wafer and having a radius of 2 inches are defined as "upper point", "right point", "lower point", and "left point" in the clockwise direction, respectively.

A correlation line 15b of an upper portion shows a relationship of the reflectance with the wavelength of the light 10 at the upper point. A correlation line 15c of a right portion shows a relationship of the reflectance with the wavelength of the light 10 at the right point. A correlation line 15d of a lower portion shows a relationship of the reflectance with the wavelength of the light 10 at the lower point. A correlation line 15e of a left portion shows a relationship of the reflectance with the wavelength of the light 10 at the left point. The correlation line 15a of the central portion to the correlation line 15e of the left portion are results of measuring a relationship between the wavelength of the light 10 irradiated onto the antireflection film 1 and the reflectance of the light reflected by the antireflection film 1.

The wavelength of the light 10 as a subject is set within a range from 450 nm to 650 nm. Within this range, the correlation line 15a of the central portion, the correlation line 15b of the upper portion, the correlation line 15c of the right portion, the correlation line 15d of the lower portion, and the correlation line 15e of the left portion show a reflectance of 2% or less. From these results, it can be said that the reflectance is substantially 2% or less in all the places of the wafer. Therefore, by using the production method according to this embodiment, an antireflection film having the respective layers can be extremely uniformly formed within the wafer plane. As a result, a highly uniform reflectance can be obtained throughout the entire surface of the 6-inch wafer.

The film thickness of the antireflection film 1 is from 219 nm to 333 nm. The film stress when the film thickness of the antireflection film 1 is 250 nm was 60 MPa. The film stress of the $SiO_2$ film of the first insulating film 3 and the second insulating film 5 is from 180 MPa to 250 MPa, and therefore, the antireflection film 1 can make the film stress extremely small as compared with the $SiO_2$ film.

As described above, according to this embodiment, the following effects are exhibited.

(1) According to this embodiment, the light shielding layer 6, the first transmission layer 7, the semi-transmission layer 8, and the second transmission layer 9 are placed on the substrate 2 in this order. The light shielding layer 6 and the semi-transmission layer 8 contain an electrical conductor, and the first transmission layer 7 and the second transmission layer 9 contain a dielectric. The light 10 is incident on the incident surface 9a on the opposite side to the semi-transmission layer 8 of the second transmission layer 9. Part of the light 10 which is incident on the incident surface 9a passes through the second transmission layer 9 and the semi-transmission layer 8, and then travels through the first transmission layer 7 to reach the interface 6a between the first transmission layer 7 and the light shielding layer 6. At the interface 6a between the first transmission layer 7 and the light shielding layer 6, part of the light 10 is reflected and changes its traveling direction. The reflected light 10 passes through the first transmission layer 7 and the semi-transmission layer 8, and then travels through the second transmission layer 9 to reach the incident surface 9a.

Part of the light 10 which travels through the second transmission layer 9 is reflected by the incident surface 9a and passes through the semi-transmission layer 8, and then travels toward the first transmission layer 7. The semi-transmission layer 8 has a large extinction coefficient, and therefore, when light passes through the semi-transmission layer 8, the light intensity is attenuated, and the light is converted into heat. Therefore, the light which travels between the incident surface 9a and the interface 6a between the first transmission layer 7 and the light shielding layer is attenuated whenever it passes through the semi-transmission layer 8.

At the interface 6a between the first transmission layer 7 and the light shielding layer 6, part of the light 10 penetrates through the light shielding layer 6. Since the light shielding layer 6 has a large extinction coefficient, the light 10 which travels through the light shielding layer 6 is absorbed by the light shielding layer 6. Therefore, also when the reflectance of the substrate 2 is high, the light shielding layer 6 can extinct the light 10. As a result, also when the reflectance of the substrate 2 is high, the reflection of the light 10 irradiated onto the antireflection film 1 can be reliably suppressed by the antireflection film 1. Also, when a wiring or an element having a high reflectance is provided between the substrate 2 and the light shielding layer 6, the reflection of the light 10 irradiated onto the antireflection film 1 can be reliably suppressed by the antireflection film 1.

(2) According to this embodiment, the material of the light shielding layer 6 contains any of titanium, gold, chromium, nickel, platinum, tin, copper, and iron. Titanium, gold, chromium, nickel, platinum, tin, copper, and iron have a larger extinction coefficient than silicon dioxide, titanium oxide, and zinc peroxide, and therefore can efficiently attenuate the light 10 which passes through the layer. The material of the semi-transmission layer 8 contains titanium. Titanium has a larger extinction coefficient than silicon dioxide, titanium oxide, and zinc peroxide, and therefore can efficiently attenuate light which passes through the layer. The material of the first transmission layer 7 and the second transmission layer 9 contains aluminum oxide. The refractive index of aluminum oxide is between the refractive index of air and the refractive index of titanium. As a difference in refractive index is larger, the reflectance becomes higher. Therefore, the reflectance when light penetrates through a layer of aluminum oxide from air can be made smaller than the reflectance when light penetrates through a layer of titanium from air. As a result, the reflectance of the antireflection film 1 can be made smaller when only the light shielding layer 6 is placed on the substrate 2.

(3) According to this embodiment, the thickness of the light shielding layer 6 is larger than that of the semi-transmission layer 8. By setting the thickness of the light shielding layer 6 large, the light 10 which penetrates through the light shielding layer 6 can be reliably attenuated by the light shielding layer 6. Accordingly, also when the reflectance of the substrate 2 is high, the light incident on the light shielding layer 6 can be reliably attenuated by the light shielding layer 6.

(4) According to this embodiment, the thickness of the light shielding layer 6 is 80 nm or more. When the thickness of the light shielding layer 6 is 80 nm or more, the effect of the light 10 which passes through the light shielding layer 6 and is reflected can be reduced. Further, by setting the thickness of the light shielding layer 6 to 150 nm or less, the light shielding layer 6 can be produced with high productivity.

(5) According to this embodiment, the thickness of the first transmission layer 7 is 70 nm or more and 90 nm or less. Then, the thickness of the semi-transmission layer 8 is 9 nm or more and 12 nm or less. Then, the thickness of the second transmission layer 9 is 60 nm or more and 80 nm or less. At this time, the thickness of each layer is set so as to decrease the reflectance with respect to light with a wavelength of 450 nm to 650 nm, and therefore, the antireflection film 1 can reliably suppress the reflection of the light 10.

(6) According to this embodiment, the thickness of the first transmission layer 7 is preferably 75 nm or more and 85 nm or less. Then, the thickness of the semi-transmission layer 8 is preferably 10 nm or more and 11 nm or less. Then, the thickness of the second transmission layer 9 is preferably 65 nm or more and 75 nm or less. At this time, the thickness of each layer is set so as to further decrease the reflectance with respect to light with a wavelength of 450 nm to 650 nm, and therefore, the antireflection film 1 can more reliably suppress the reflection of the light 10.

(7) According to this embodiment, in the production method for the antireflection film 1, the light shielding layer 6, the first transmission layer 7, the semi-transmission layer 8, and the second transmission layer 9 are placed on the substrate 2 in this order. When $SiO_2$ is deposited on an antireflection film in the related art, a plasma CVD (Chemical Vapor Deposition) method is used. When using the plasma CVD method, it is difficult to form a film at a stable deposition rate and the in-plane uniformity is low, and therefore, it is difficult to obtain a film thickness with high accuracy.

On the other hand, when placing the first transmission layer 7 and the second transmission layer 9, an ALCVD (Atomic Layer Chemical Vapor Deposition) method is used. By using the ALCVD method, aluminum oxide can be stacked at the atomic level, and therefore, an aluminum oxide layer having a film thickness with high accuracy can be placed as the first transmission layer 7 and the second transmission layer 9.

(8) According to this embodiment, the film thickness of the antireflection film 1 is from 219 nm to 333 nm. The antireflection film 1 is thin, and therefore can be easily partially removed using dry etching. Therefore, the antireflection film 1 can be easily patterned. Further, stress is hardly applied to the substrate 2, and therefore, warpage of the substrate 2 can be suppressed.

(9) According to this embodiment, the antireflection film 1 can be constituted by titanium and aluminum oxide. At this time, the antireflection film 1 is a film which is hardly corroded by hydrogen fluoride. Therefore, the substrate 2 can be etched using hydrogen fluoride vapor. As a result, even if a structure in which stiction is likely to occur is provided in the substrate 2, the structure can be produced by etching using hydrogen fluoride vapor.

(10) According to this embodiment, even if the size of the substrate 2 is 6 inches, the reflectance can be decreased to 2% or less. Therefore, the antireflection film 1 can be placed in a wide range.

(11) According to this embodiment, the materials of the antireflection film 1 are titanium, aluminum, and oxygen. These materials are easily available. Further, also in the production method, the production can be performed using an easily available device. Therefore, the antireflection film 1 can be easily produced.

Second Embodiment

Next, one embodiment of an image display device will be described with reference to FIGS. 14 to 17. To the image display device according to this embodiment, the antireflection film 1 according to the first embodiment is applied. A description of the same matter as that of the first embodiment will be omitted.

Figure 14:
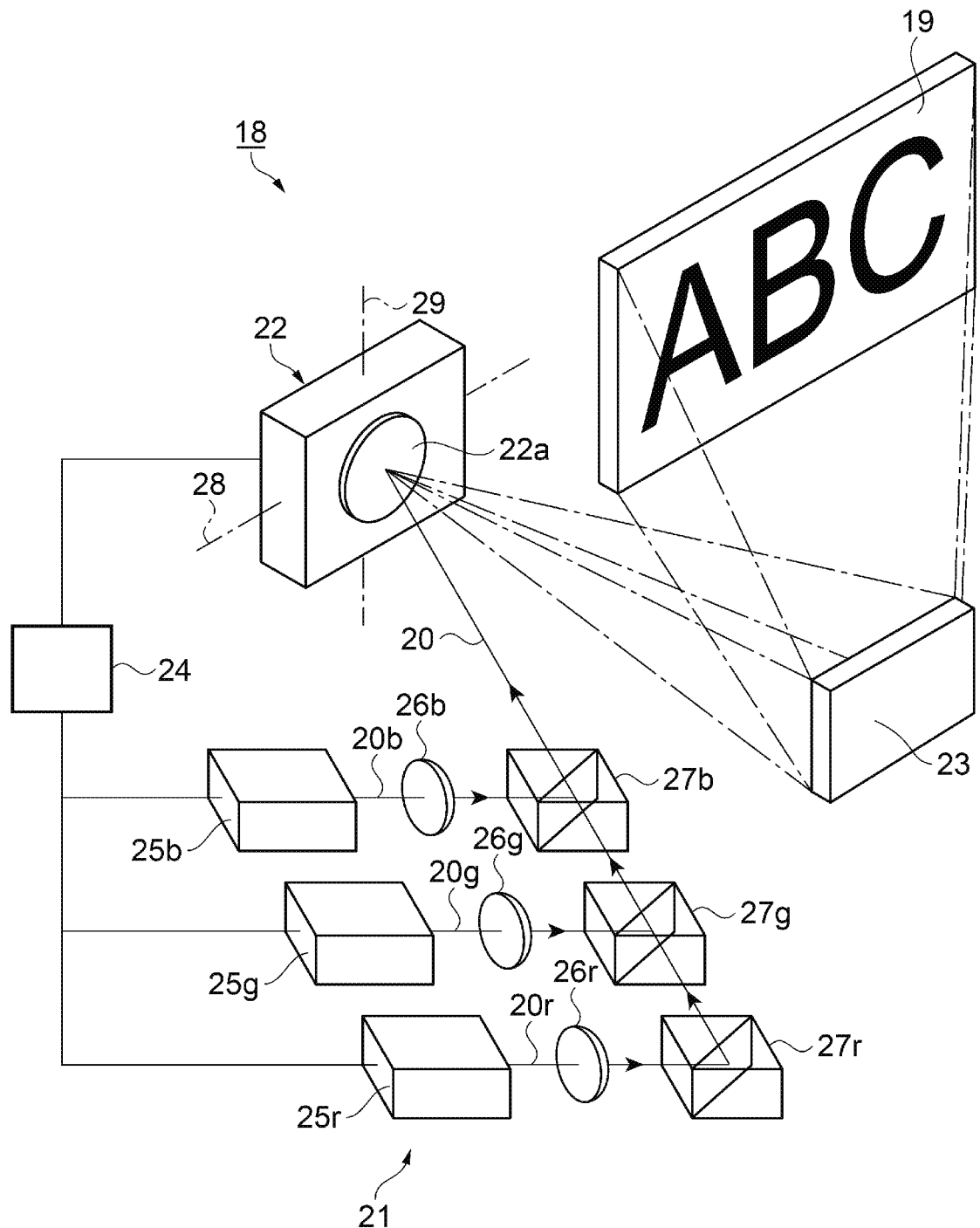
FIG. 14 is a configuration view showing the configuration of an image display device according to a second embodiment.

FIG. 14 is a configuration view showing the configuration of an image display device. An image display device 18 shown in FIG. 14 is a device which displays an image by performing two-dimensional scanning of drawing laser beam 20 as a light beam on a screen 19 such as a screen or a wall surface. The image display device 18 includes a drawing light source unit 21 which emits the drawing laser beam 20, an optical scanner 22 as an optical device which scans the drawing laser beam 20, a mirror 23 which reflects the drawing laser beam 20 scanned by the optical scanner 22, and a control unit 24 which controls the operations of the drawing light source unit 21 and the optical scanner 22. The mirror 23 may be provided as needed and may be omitted.

The drawing light source unit 21 includes laser light sources 25r, 25g, and 25b as light sources of the respective colors of red, green, and blue, collimator lenses 26r, 26g, and 26b and dichroic mirrors 27r, 27g, and 27b which are provided corresponding to the laser light sources 25r, 25g, and 25b.

Each of the laser light sources 25r, 25g, and 25b includes a driving circuit (not shown) for driving the light source. The laser light source 25r emits a red laser beam 20r, the laser light source 25g emits a green laser beam 20g, and the laser light source 25b emits a blue laser beam 20b. Each of the laser beams 20r, 20g, and 20b is emitted corresponding to a driving signal transmitted from the control unit 24, and is converted into parallel light or approximately parallel light by the collimator lenses 26r, 26g, and 26b. As the laser light sources 25r, 25g, and 25b, for example, a semiconductor laser such as an edge emitting semiconductor laser or a surface emitting semiconductor laser can be used. By using the semiconductor laser, it is possible to miniaturize the laser light sources 25r, 25g, and 25b.

The dichroic mirror 27r, the dichroic mirror 27g, and the dichroic mirror 27b are disposed according to the disposition of the laser light sources 25r, 25g, and 25b. The dichroic mirror 27r has a property of reflecting the laser beam 20r. The dichroic mirror 27g has a property of reflecting the laser beam 20g and also transmitting the laser beam 20r. The dichroic mirror 27b has a property of reflecting the laser beam 20b and also transmitting the laser beams 20r and 20g. By the dichroic mirrors 27r, 27g, and 27b, the laser beams 20r, 20g, and 20b of the respective colors are synthesized so as to become the drawing laser beam 20 as the light.

The optical scanner 22 includes a reflection surface 22a as a mirror which reflects the drawing laser beam 20, and the drawing laser beam 20 emitted from the drawing light source unit 21 is irradiated onto the reflection surface 22a. The optical scanner 22 oscillates the reflection surface 22a by using a horizontal axis 28 as an axis, and oscillates the reflection surface 22a by using a vertical axis 29 as an axis. Accordingly, the drawing laser beam 20 can be scanned in two directions of the vertical and horizontal directions. That is, the optical scanner 22 has a function to two-dimensionally scan the drawing laser beam 20. The drawing laser beam 20 reflected by the reflection surface 22a is reflected by the mirror 23 and irradiated onto the screen 19. Then, by the drawing laser beam 20, a predetermined pattern is drawn on the screen 19.

Figure 15:
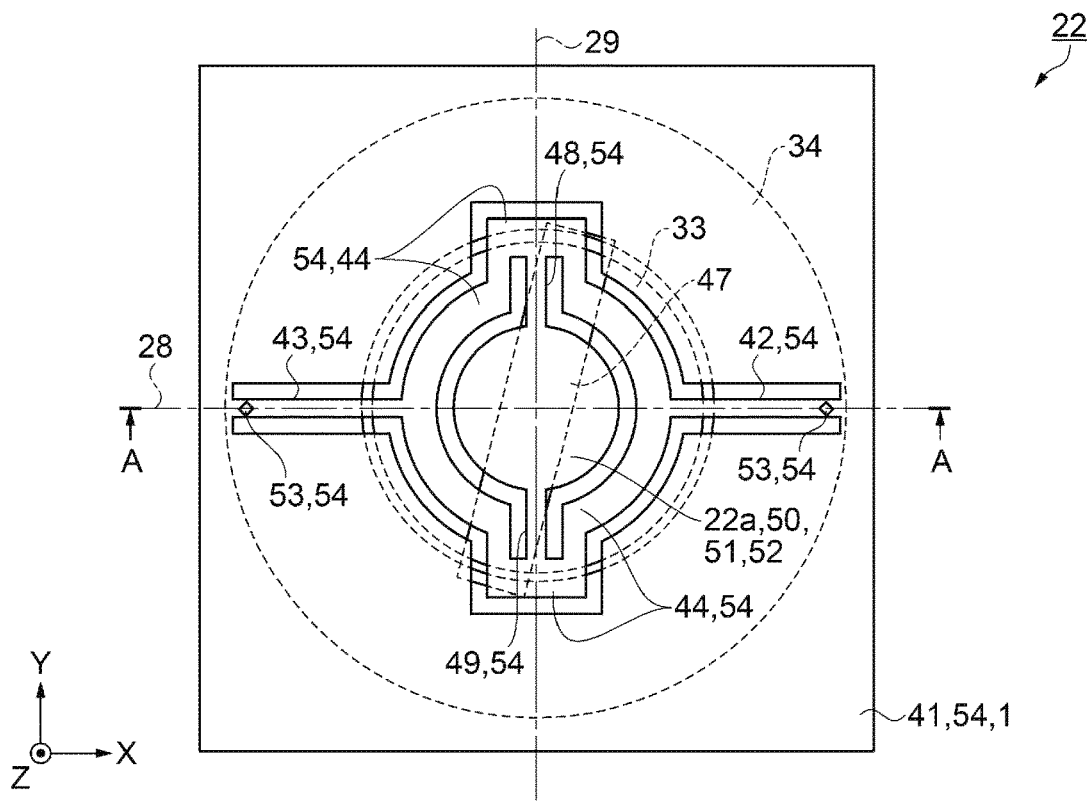
FIG. 15 is a schematic top view showing the structure of an optical scanner.
Figure 16:
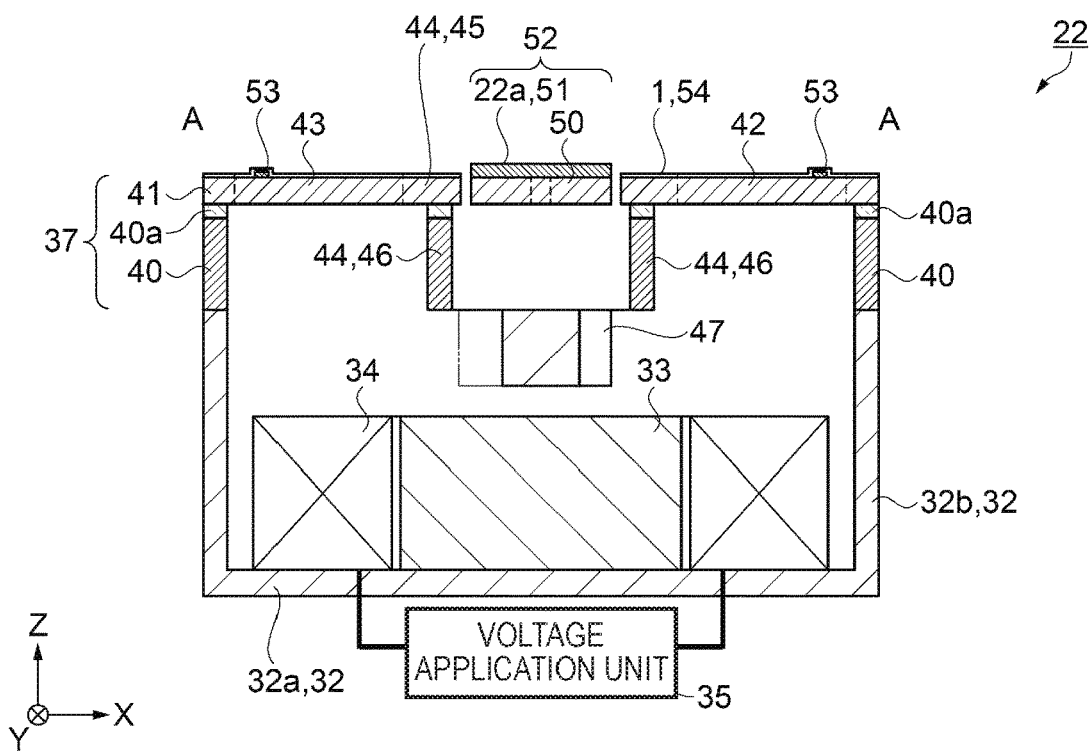
FIG. 16 is a schematic side cross-sectional view showing the structure of the optical scanner.

FIG. 15 is a schematic top view showing the structure of the optical scanner. FIG. 16 is a schematic side cross-sectional view showing the structure of the optical scanner, and is a cross-sectional view viewed from a plane along the A-A line of FIG. 15. As shown in FIGS. 15 and 16, the optical scanner 22 includes a bottomed square tubular housing 32, and a bottom plate 32a of the housing 32 has a square shape. A square tubular side plate 32b is provided to stand on the bottom plate 32a. In the housing 32, a magnetic core 33 and a coil 34 are placed on the bottom plate 32a. The shape of the magnetic core 33 is a cylindrical shape, and the coil 34 is disposed surrounding the magnetic core 33. The magnetic core 33 and the coil 34 constitute an electromagnet. To the coil 34, a voltage application unit 35 is connected, and the voltage application unit 35 supplies an electric current to the coil 34.

A direction in which one side of the bottom plate 32a of the housing 32 is defined as "X direction". The X direction is a direction in which the horizontal axis 28 extends. A direction orthogonal to the X direction in the bottom surface is defined as "Y direction". The Y direction is a direction in which the vertical axis 29 extends. The thickness direction of the magnetic core 33 is defined as "Z direction". The side plate 32b of the housing 32 extends from the bottom plate 32a in the Z direction. The Z direction is a direction which the reflection surface 22a faces. The X direction, the Y direction, and the Z direction are orthogonal to one another. The drawing laser beam 20 is irradiated from the +Z direction, and the drawing laser beam 20 reflected by the reflection surface 22a travels in the +Z direction.

On the housing 32, a structure 37 is placed. The structure 37 includes a support connection portion 40 whose shape when viewed from the Z direction is a rectangular tubular shape, and the support connection portion 40 is placed superimposed on the side plate 32b. On a surface facing the Z direction of the support connection portion 40, an oxide film 40a is placed. On the Z direction side of the support connection portion 40, a support portion 41 whose outer shape is a rectangular shape is placed.

A third shaft portion 42 as a torsion bar and a fourth shaft portion 43 as a torsion bar extending in the X direction are placed at the center in the Y direction of the support portion 41. The third shaft portion 42 and the fourth shaft portion 43 are disposed facing each other along the horizontal axis 28. Between the third shaft portion 42 and the fourth shaft portion 43, a displacement portion 44 is placed.

One end of the third shaft portion 42 is connected to the support portion 41 and the other end thereof is connected to a displacement portion 44. Similarly, one end of the fourth shaft portion 43 is connected to the support portion 41 and the other end thereof is connected to the displacement portion 44. Accordingly, the third shaft portion 42 and the fourth shaft portion 43 are configured to support the displacement portion 44.

The third shaft portion 42 and the fourth shaft portion 43 function as a pair of torsion bars, and the displacement portion 44 oscillates by using the horizontal axis as a rotation axis. The displacement portion 44 is constituted by a platy member 45 having a plate-like shape and a magnet support portion 46 as a frame portion. The magnet support portion 46 is located on the −Z direction side of the platy member 45 and has a tubular shape.

On the magnetic core 33 side of the magnet support portion 46, a permanent magnet 47 is placed. The permanent magnet 47 is driven by the electromagnet composed of the coil 34 and the magnetic core 33.

A first shaft portion 48 as a torsion bar and a second shaft portion 49 as a torsion bar extending in the Y direction are placed at the center in the X direction of the displacement portion 44. The first shaft portion 48 and the second shaft portion 49 are disposed facing each other along the vertical axis 29. Between the first shaft portion 48 and the second shaft portion 49, a movable plate 50 is placed. The movable plate 50 has a circular plate-like shape, and a surface on the Z direction side of the movable plate 50 is the reflection surface 22a.

One end of the first shaft portion 48 is connected to the displacement portion 44 and the other end thereof is connected to the movable plate 50. Similarly, one end of the second shaft portion 49 is connected to the displacement portion 44 and the other end thereof is connected to the movable plate 50. Accordingly, the first shaft portion 48 and the second shaft portion 49 are configured to support the movable plate 50. The first shaft portion 48 and the second shaft portion 49 function as a pair of torsion bars, and the movable plate 50 oscillates by using the vertical axis 29 as a rotation axis.

The movable plate 50 constitutes a first vibration system which oscillates or reciprocates by using the vertical axis 29 as a rotation axis. The first shaft portion 48 and the second shaft portion 49 function as torsion bars, and the first shaft portion 48 and the second shaft portion 49 have a predetermined spring constant. A natural frequency when the movable plate 50 oscillates is determined by the spring constant of the first shaft portion 48 and the second shaft portion 49 and the mass of the movable plate 50. The torsion bar is also referred to as a torsion bar spring. The displacement portion 44 constitutes a second vibration system which oscillates or reciprocates by using the horizontal axis 28 as a rotation axis. The permanent magnet 47, the coil 34, the magnetic core 33, and the voltage application unit 35 constitute a driving unit for driving the above-mentioned first vibration system and the second vibration system.

The movable plate 50 oscillates by using the vertical axis 29 as a rotation axis, and the displacement portion 44 oscillates by using the horizontal axis 28 as a rotation axis. Accordingly, the movable plate 50 and the reflection surface 22a can be made to oscillate around two axes of the horizontal axis 28 and the vertical axis 29 which are orthogonal to each other.

A reflection film 51 as a light reflection portion is placed on the surface facing the Z direction of the movable plate 50, and part of the drawing laser beam 20 to be irradiated is reflected by the reflection surface 22a which is the surface of the reflection film 51. A reflector 52 as a light reflection portion is constituted by the movable plate 50 and the reflection film 51.

The permanent magnet 47 is bonded to the displacement portion 44 on the −Z direction side through the magnet support portion 46. The displacement portion 44, the magnet support portion 46, and the permanent magnet 47 are adhered to one another using an adhesive. The permanent magnet 47 is disposed symmetrically with an intersection between the vertical axis 29 and the horizontal axis 28 as the center in a plan view when viewed from the Z direction.

The permanent magnet 47 has a bar shape which extends in a direction inclined with respect to both axes of the horizontal axis 28 and the vertical axis 29. The permanent magnet 47 is magnetized in the longitudinal direction thereof. The permanent magnet 47 on the +X direction side and the +Y direction side is magnetized to the N pole, and the permanent magnet 47 on the −X direction side and the −Y direction side is magnetized to the S pole. The permanent magnet 47 is magnetized in a direction in which a line segment which connects the N pole and the S pole to each other is inclined with respect to the horizontal axis 28 and the vertical axis 29 in a plan view.

Immediately below the permanent magnet 47, the coil 34 and the magnetic core 33 are provided. The coil 34 is provided wound around the magnetic core 33. Accordingly, a magnetic field generated by the coil 34 can be efficiently made to act on the permanent magnet 47. The coil 34 is electrically connected to the voltage application unit 35. Then, by applying a voltage to the coil 34 through the voltage application unit 35, a magnetic field having a magnetic flux orthogonal to the horizontal axis 28 and the vertical axis 29 is generated from the coil 34.

A distortion detection element 53 is placed on the support portion 41 side of the third shaft portion 42 and the fourth shaft portion 43. The distortion detection element 53 is an element whose resistance value changes according to the distortion on the surfaces of the third shaft portion 42 and the fourth shaft portion 43. When the third shaft portion 42 and the fourth shaft portion 43 are twisted, the distortion detection element 53 is distorted according to the rotation angle. Then, by detecting the resistance value of the distortion detection element 53, the angle of rotation of the third shaft portion 42 and the fourth shaft portion 43 can be detected.

The material of the third shaft portion 42 and the fourth shaft portion 43 is silicon, and the distortion detection element 53 is formed by doping an impurity into a silicon single crystal of the third shaft portion 42 and the fourth shaft portion 43. The distortion detection element 53 is also referred to as "piezoresistive element". A wiring (not shown) is provided connected to the distortion detection element 53. The material of the wiring is aluminum, and the wiring is formed from a material which easily reflects the drawing laser beam 20.

The antireflection film 1 is placed on the surfaces on the +Z direction side of the support portion 41, the third shaft portion 42, the fourth shaft portion 43, the displacement portion 44, the first shaft portion 48, and the second shaft portion 49. Each of the support portion 41, the third shaft portion 42, the fourth shaft portion 43, the displacement portion 44, the first shaft portion 48, and the second shaft portion 49 is a light absorbing portion 54 which absorbs the light 10 or the drawing laser beam 20 to be irradiated. On the light absorbing portion 54, the antireflection film 1 according to the first embodiment is placed.

In the antireflection film 1, the light shielding layer 6, the first transmission layer 7, the semi-transmission layer 8, and the second transmission layer 9 are placed on the substrate 2. The antireflection film 1 having such a structure can reliably suppress the reflection of the light 10 or the drawing laser beam 20 irradiated onto the light absorbing portion 54. Therefore, the optical scanner 22 reflects the light 10 or the drawing laser beam 20 to be irradiated onto the reflector 52, and can reliably suppress the reflection of the light 10 or the drawing laser beam 20 to be irradiated onto the light absorbing portion 54.

The reflector 52 of the optical scanner 22 has the reflection surface 22*a*. The light absorbing portion 54 includes the third shaft portion 42, the fourth shaft portion 43, the first shaft portion 48, and the second shaft portion 49, each of which rotatably supports the reflection surface 22*a*. The reflection surface 22*a* is rotated by distorting the third shaft portion 42, the fourth shaft portion 43, the first shaft portion 48, and the second shaft portion 49. Then, by rotating the reflection surface 22*a*, the optical scanner 22 scans in the traveling direction of the drawing laser beam 20 to be irradiated onto the reflection surface 22*a*.

The light absorbing portion 54 has the antireflection film 1. This antireflection film 1 can reliably suppress the reflection of the light 10 or the drawing laser beam 20 irradiated onto the antireflection film 1. The optical scanner 22 reflects the light 10 or the drawing laser beam 20 to be irradiated onto the reflection surface 22*a*. Then, the reflection of the light 10 or the drawing laser beam 20 to be irradiated onto the light absorbing portion 54 can be reliably suppressed. Further, the antireflection film 1 is thin, and therefore, the effect exerted on the spring constant of the third shaft portion 42, the fourth shaft portion 43, the first shaft portion 48, and the second shaft portion 49 can be suppressed.

Figure 17:
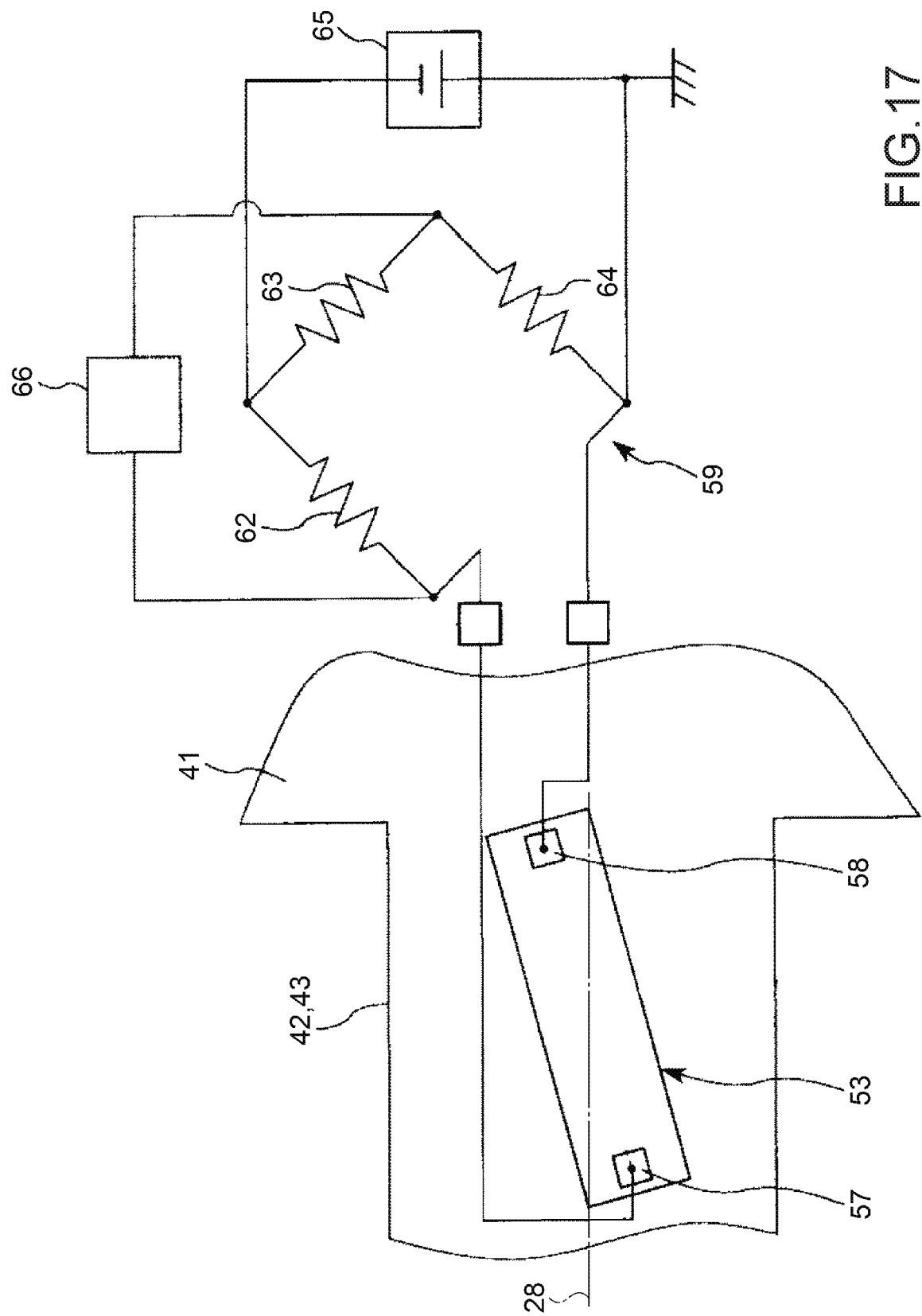
FIG. 17 is a circuit diagram of a circuit for driving a distortion detection element.

FIG. 17 is a circuit diagram of a circuit for driving a distortion detection element. The distortion detection element 53 is disposed on the third shaft portion 42 and the fourth shaft portion 43, and detects the distortion of the third shaft portion 42 and the fourth shaft portion 43. The distortion detection element 53 is a two-terminal type piezoresistive element. The distortion detection element 53 includes a terminal 57 and a terminal 58.

Further, the distortion detection element 53 has an elongated shape extending in a direction inclined with respect to the longitudinal direction of the horizontal axis 28. A pair of terminal 57 and terminal 58 is electrically connected to a signal processing circuit 59. A detection signal of the distortion detection element 53 is input to the signal processing circuit 59.

The signal processing circuit 59 includes a first resistance element 62, a second resistance element 63, a third resistance element 64, a driving circuit 65, and a processing unit 66. The first resistance element 62, the second resistance element 63, the third resistance element 64, and the distortion detection element 53 constitute a Wheatstone bridge circuit. The Wheatstone bridge circuit is supplied with electric power from the driving circuit 65, and outputs a voltage signal according to a change in the resistance value of the distortion detection element 53 to the processing unit 66. Then, the processing unit 66 calculates the distortion of the distortion detection element 53 from the output of the distortion detection element 53.

As described above, according to this embodiment, the following effects are exhibited.

(1) According to this embodiment, the optical scanner 22 includes the reflector 52 and the light absorbing portion 54. Then, on the light absorbing portion 54, the antireflection film 1 described above is placed. In this antireflection film 1, the light shielding layer 6, the first transmission layer 7, the semi-transmission layer 8, and the second transmission layer 9 are placed on the substrate 2. The antireflection film 1 having such a structure can reliably suppress the reflection of the light 10 or the drawing laser beam 20 irradiated onto the light absorbing portion 54. Therefore, the optical scanner 22 reflects the light 10 or the drawing laser beam 20 to be irradiated onto the reflector 52, and can reliably suppress the reflection of the light 10 or the drawing laser beam 20 to be irradiated onto the light absorbing portion 54.

(2) According to this embodiment, in the optical scanner 22, the reflector 52 has the reflection surface 22*a*. The light absorbing portion 54 includes the third shaft portion 42, the fourth shaft portion 43, the first shaft portion 48, and the second shaft portion 49, each of which rotatably supports the reflection surface 22*a*. The reflection surface 22*a* is rotated by distorting the third shaft portion 42, the fourth shaft portion 43, the first shaft portion 48, and the second shaft portion 49. Then, by rotating the reflection surface 22*a*, the optical scanner 22 scans in the traveling direction of the drawing laser beam 20 to be irradiated onto the reflection surface 22*a*.

The light absorbing portion 54 has the antireflection film 1. This antireflection film 1 can reliably suppress the reflection of the light 10 or the drawing laser beam 20 irradiated onto the antireflection film 1. Therefore, the optical scanner 22 reflects the light 10 or the drawing laser beam 20 to be irradiated onto the reflection surface 22*a*, and can reliably suppress the reflection of the light 10 or the drawing laser beam 20 to be irradiated onto the light absorbing portion 54. Therefore, even if the distortion detection element 53 is an element having a high reflectance, the reflection of the light 10 or the drawing laser beam 20 which travels toward the distortion detection element 53 can be reliably suppressed by the antireflection film 1.

(3) According to this embodiment, the film thickness of the antireflection film 1 is 333 nm or less at most. The thickness of the film can be decreased to half or less as compared with a case of performing equivalent suppression of reflection using $SiO_2$, $TiO_2$, and $ZnO_2$ for the semi-transmission layer 8 and the light shielding layer 6. Accordingly, since the antireflection film 1 is thin, the effect exerted on the spring constant of the third shaft portion 42, the fourth shaft portion 43, the first shaft portion 48, and the second shaft portion 49 can be suppressed.

(4) According to this embodiment, the optical scanner 22 includes the reflector 52 which can oscillate in two axes. At this time, when the drawing laser beam 20 to be incident is irradiated onto a region other than the reflection surface 22*a* and reflected, the reflected light becomes noise on the display. In the optical scanner 22, the antireflection film 1 is placed on the light absorbing portion 54. Therefore, even if the drawing laser beam 20 is irradiated onto a region other than the reflection surface 22*a*, the reflection is suppressed. As a result, the occurrence of noise in an image to be displayed on the screen 19 can be suppressed.

(5) According to this embodiment, the antireflection film 1 is a film having a small internal stress. Accordingly, warpage of the platy member 45 hardly occurs, and therefore, a step of removing warpage can be omitted.

This embodiment is not limited to the above-mentioned embodiment and various changes and modifications can be added by those ordinarily skilled in the art within the scope of the technical idea of the invention. Hereinafter, modification examples will be described.

Modification Example 1

In the above-mentioned first embodiment, the ALCVD method is used when placing the first transmission layer 7 and the second transmission layer 9. The ALCVD method may be used only for the first transmission layer 7, and may be used only for the second transmission layer 9. In either case, the film formed using the ALCVD method can have a film thickness with high accuracy.

Modification Example 2

In the above-mentioned first embodiment, the first insulating film 3, the wiring 4, and the second insulating film 5 are placed on the substrate 2. However, the first insulating film 3, the wiring 4, and the second insulating film 5 may not be provided on the substrate 2. Then, the light shielding layer 6 may be directly placed on the substrate 2.

Modification Example 3

In the above-mentioned first embodiment, the first transmission layer 7 is placed superimposed on the light shielding layer 6. Between the light shielding layer 6 and the first transmission layer 7, a predetermined layer may be placed. For example, a layer which improves the adhesiveness between the light shielding layer 6 and the first transmission layer 7 may be placed. The semi-transmission layer 8 is placed superimposed on the first transmission layer 7. Between the first transmission layer 7 and the semi-transmission layer 8, a predetermined layer may be placed. For example, a layer of a material having a refractive index which is between the refractive index of the first transmission layer 7 and the refractive index of the semi-transmission layer 8 may be placed. This can suppress the reflection of the light 10 at the interface between the first transmission layer 7 and the semi-transmission layer 8.

Between the semi-transmission layer 8 and the second transmission layer 9, a predetermined layer may be placed. For example, a layer of a material having a refractive index which is between the refractive index of the semi-transmission layer 8 and the refractive index of the second transmission layer 9 may be placed. This can suppress the reflection of the light 10 at the interface between the semi-transmission layer 8 and the second transmission layer 9.

Modification Example 4

In the above-mentioned second embodiment, an example in which the optical scanner 22 is applied to the image display device 18 is shown. In addition thereto, the optical scanner 22 may be applied to an HMD (Head Mounted Display). In addition thereto, the optical scanner 22 may be applied to an optical scanning device for measuring a distance utilizing a TOF (Time Of Flight) method.

Further, the antireflection film 1 may be used not only in the optical scanning device, but also in an optical MEMS device provided with an antireflection film. The antireflection film 1 can reliably suppress the reflection even if the substrate 2 has a high reflectance, and therefore, light noise can be reduced. Further, the antireflection film 1 is a film which is hardly corroded by hydrogen fluoride vapor. Due to this, by using hydrogen fluoride vapor in the etching step in MEMS, stiction can be made less likely to occur in this step.

The antireflection film 1 extremely suppresses the reflection of the light 10 by absorbing the light 10 to convert the light into heat. Therefore, the antireflection film 1 may be used as a light absorbing film. For example, the antireflection film 1 can be used as a light absorbing film of a pyroelectric sensor or the like.

The entire disclosure of Japanese Patent Application No. 2017-087985 filed on Apr. 27, 2017 is expressly incorporated by reference herein.

What is claimed is:

1. An antireflection film, comprising:
a light shielding layer which is placed on a substrate and contains an electrical conductor;
a first transmission layer which is placed on the light shielding layer and contains a dielectric;
a semi-transmission layer which is placed on the first transmission layer and contains an electrical conductor; and
a second transmission layer which is placed on the semi-transmission layer and contains a dielectric,
wherein the light shielding layer and the semi-transmission layer have a larger extinction coefficient than the first transmission layer and the second transmission layer,
the first transmission layer is an aluminum oxide layer having a thickness of 70 nm or more and 90 nm or less,
the semi-transmission layer is a titanium layer having a thickness of 9 nm or more and 12 nm or less, and
the second transmission layer is an aluminum oxide layer having a thickness of 60 nm or more and 80 nm or less.

2. The antireflection film according to claim 1, wherein the first transmission layer has a thickness of 75 nm or more and 85 nm or less,
the semi-transmission layer has a thickness of 10 nm or more and 11 nm or less, and
the second transmission layer has a thickness of 65 nm or more and 75 nm or less.

3. An optical device, comprising
a light absorbing portion, wherein
the antireflection film according to claim 2 is placed on the light absorbing portion.

4. An optical device, comprising
a light absorbing portion, wherein
the antireflection film according to claim 1 is placed on the light absorbing portion.

5. The optical device according to claim 4, wherein
the device includes a mirror which reflects light,
the light absorbing portion includes a torsion bar which rotatably supports the mirror, and
the optical device scans in the traveling direction of light to be irradiated onto the mirror.

6. The antireflection film according to claim 1, wherein the material of the light shielding layer contains any of titanium, gold, chromium, nickel, platinum, tin, copper, and iron, the material of the first transmission layer contains aluminum oxide, the material of the semi-transmission layer contains titanium, and the material of the second transmission layer contains aluminum oxide.

7. An optical device, comprising
a light absorbing portion, wherein
the antireflection film according to claim 6 is placed on the light absorbing portion.

8. The antireflection film according to claim 6, wherein the thickness of the light shielding layer is larger than that of the semi-transmission layer.

9. An optical device, comprising
a light absorbing portion, wherein
the antireflection film according to claim 8 is placed on the light absorbing portion.

10. The antireflection film according to claim 6, wherein the light shielding layer is a titanium layer having a thickness of 80 nm or more and 150 nm or less.

11. An optical device, comprising
a light absorbing portion, wherein
the antireflection film according to claim 10 is placed on the light absorbing portion.

* * * * *